US012694533B2

(12) United States Patent
Giner et al.

(10) Patent No.: US 12,694,533 B2
(45) Date of Patent: *Jul. 28, 2026

(54) TUMOR SEGMENTATION TOOL

(71) Applicant: Mint Labs, Inc., Duxbury, MA (US)

(72) Inventors: Santiago Puch Giner, Barcelona (ES); Vesna Prchkovska, Barcelona (ES); Paulo Reis Rodrigues, Barcelona (ES)

(73) Assignee: Mint Labs, Inc., Duxbury, MA (US)

( * ) Notice: Subject to any disclaimer, the term of this patent is extended or adjusted under 35 U.S.C. 154(b) by 81 days.

This patent is subject to a terminal disclaimer.

(21) Appl. No.: 18/440,510

(22) Filed: Feb. 13, 2024

(65) Prior Publication Data

US 2025/0037284 A1 Jan. 30, 2025

Related U.S. Application Data

(63) Continuation of application No. 17/256,528, filed as application No. PCT/US2019/039990 on Jun. 28, 2019, now Pat. No. 11,900,606.

(Continued)

(51) Int. Cl.
*G06T 7/11* (2017.01)
*G06T 7/168* (2017.01)

(52) U.S. Cl.
CPC ................ *G06T 7/11* (2017.01); *G06T 7/168* (2017.01); *G06T 2207/10088* (2013.01);
(Continued)

(58) Field of Classification Search
CPC . G06T 7/11; G06T 7/168; G06T 2207/10088; G06T 2207/20081;
(Continued)

(56) References Cited

U.S. PATENT DOCUMENTS

| | | | |
|---|---|---|---|
| 8,165,385 | B2 | 4/2012 | Reeves et al. |
| 8,675,934 | B2 | 3/2014 | Wehnes et al. |

(Continued)

FOREIGN PATENT DOCUMENTS

| | | | |
|---|---|---|---|
| CN | 114359302 A | * | 4/2022 |
| WO | WO-2018/156778 A1 | | 8/2018 |

(Continued)

OTHER PUBLICATIONS

Drozdzal et al. "The Importance of Skip Connections in Biomedical Image Segmentation." Lecture Notes in Computer Science, vol. 10008, https://doi.org/10.1007/978-3-319-46976-8_19, Sep. 27, 2016, pp. 179-187 (Year: 2016).

(Continued)

*Primary Examiner* — Stephen R Koziol
*Assistant Examiner* — Benedict E Lee
(74) *Attorney, Agent, or Firm* — John D. Lanza; Foley Hoag LLP

(57) ABSTRACT

Systems and methods of tumor segmentation are receiving data having dimensions of a first size and a first kernel size. A residual volume is produced from the input volume. A first, second, and third intermediate volume are produced by from convolving a first, second, and third dimension volume of the residual volume to 1. A first global volume is produced from sums of the residual volumes. A downsampled volume is produced from the input volume. A residual downsampled volume is produced from the downsampled volume. A first, second, and third intermediate downsampled volume is produced from convolving a first, second, and third dimension volume of the downsampled volume to 1. A second global volume is produced from sums of the intermediate downsampled volumes. The second global volume is upsampled. An output volume is produced from integrating the first global volume and the second global volume.

20 Claims, 11 Drawing Sheets

Related U.S. Application Data

(60) Provisional application No. 62/743,697, filed on Oct. 10, 2018, provisional application No. 62/692,267, filed on Jun. 29, 2018.

(52) U.S. Cl.
CPC .............. *G06T 2207/20081* (2013.01); *G06T 2207/20084* (2013.01); *G06T 2207/30016* (2013.01); *G06T 2207/30096* (2013.01)

(58) Field of Classification Search
CPC . G06T 2207/20084; G06T 2207/30016; G06T 2207/30096; G06T 7/00; G06T 7/0012; G06N 3/0464; G06N 3/09; G06N 3/048; G06N 3/082; G06N 3/045
See application file for complete search history.

(56) References Cited

U.S. PATENT DOCUMENTS

| | | | |
|---|---|---|---|
| 11,379,985 B2 * | 7/2022 | Wang .................... | G06T 7/0012 |
| 11,900,606 B2 * | 2/2024 | Giner ................... | G06N 3/0464 |
| 2006/0099569 A1 | 5/2006 | Akimoto et al. | |
| 2020/0167930 A1 | 5/2020 | Wang et al. | |
| 2021/0279880 A1 | 9/2021 | Giner et al. | |

FOREIGN PATENT DOCUMENTS

| | | | | |
|---|---|---|---|---|
| WO | WO-2018229490 A1 * | 12/2018 | ............... | G06T 7/11 |
| WO | WO-2020006514 A1 * | 1/2020 | ............... | G06T 7/11 |

OTHER PUBLICATIONS

International Preliminary Report on Patentability for International Application No. PCT/US2019/039990 dated Jan. 7, 2021.

International Search Report for International Application No. PCT/US2019/039990 dated Sep. 13, 2019.

Kayalibay et al. "CNN-based Segmentation of Medical Imaging Data." arXiv:1701.03056v2 [cs.CV], https://doi.org/10.48550/arXiv.1701.03056, Jul. 25, 2017, pp. 1-24 (Year: 2017).

Milletari et al. "V-Net: Fully Convolutional Neural Networks for Volumetric Medical Image Segmentation." Fourth International Conference on 3D Vision (3DV), Oct. 25, 2016, pp. 565-571 (Year: 2016).

* cited by examiner

500

TUMOR SEGMENTATION TOOL

CROSS-REFERENCE TO RELATED APPLICATIONS

This Application is a Continuation of application Ser. No. 17/256,528 filed on Dec. 28, 2020, which is a U.S. National Stage Application, filed under 35 U.S.C. 371, of International Patent Application PCT/US2019/039990, filed on Jun. 28, 2019. Application No. PCT/US2019/039990 claims the benefit of U.S. Provisional Application 62/743,697 filed on Oct. 10, 2018. Application No. PCT/US2019/039990 also claims the benefit of U.S. Provisional Application 62/692,267 filed on Jun. 29, 2018. The entire contents of these applications are incorporated herein by reference in their entirety.

BACKGROUND

It is estimated that, as of today, 700.000 people in the United States are living with a primary brain tumor, from which 80% are benign and 20% are malignant tumors. Of all malignant brain tumors, 81% are gliomas, which are tumors that originate in glial cells. Gliomas can be graded from I to IV according to their aggressiveness (i.e. rate of growth), being Grade I the least malignant and Grade IV the most and can be categorized into Low Grade Gliomas (Grade I-II) and High Grade Gliomas (Grade III-IV). Glioblastomas are an example of High Grade Gliomas and also are the most common type of glioma, representing 45% of all gliomas; they have a 5-year relative survival rate of approximately 5%, which means that only 5% of people diagnosed with a glioblastoma will still be alive 5 years after being diagnosed.

Current care practice in glioblastomas performs surgical debulking followed by radiotherapy and chemotherapy, and treatment response is assessed based on 2D measurements of the enhancing area of the Magnetic Resonance (MR) images. Using the current protocols to obtain 2D measurements are suboptimal due to the number of images and volumes required to render useful information (e.g. location, shape, extension, etc.) about the glioma to provide treatment response, and additionally introduces inaccuracies between each image obtained by MR imaging. In addition, introducing a 3D image acquisition by implementing a proper in-vivo, non-invasive delineation and identification of glioma structures poses a significant burden on the radiologist: multiple imaging modalities have to be assessed in parallel, as each modality highlights different regions of the tumor, and the process of delineation in a 3D acquisition is tedious and prone to errors due to computation and memory requirement.

SUMMARY

The present disclosure is directed to systems and methods of tumor segmentation. It can be challenging to segment tumors from normal portions of the brain using images from an imaging device due to variabilities of the tumor, such as location, extension, or shape. In particular, inter-observer variability can be a major factor of inaccuracy in radiation therapy, constituting the weakest link in the radiotherapy chain that goes from diagnosis and consultation, going through 3D imaging and target volume delineation, to treatment delivery. Therefore, implementing a proper in-vivo, non-invasive delineation and identification of glioma structures can be required to generate 3D imaging with precise delineation and identification of the tumor from normal portions of the brain. The imaging device for providing a visual representation of the brain can include a magnetic resonance imaging (MRI), X-rays, computed tomography (CT) scan, ultrasound, or other devices with related imaging techniques. The variability between the location, extension, or shape of the tumor between each brain means that historical data determining at least one tumor of the brain may not be provide great details for delineating or identifying a tumor on a different brain. This disclosure can include systems and methods for autonomous tumor delineation and segmentation using segmentation systems. The segmentation systems can use a machine learning technique to delineate and identify a tumor from normal portions of the brain. The tumor can be delineated and identified by filtering various normal portions of the brain to extract the tumor corresponding to a portion of the brain. The segmentation systems can use patches of 3D images for delineating and identifying the tumor. The tumor can be color coded or otherwise labeled to indicate different main tumor structures from the delineated or identified tumors, such as an edema, enhancing tumor, or necrosis and non-enhancing tumor. Due to various variability associated with each tumor and the computation and memory requirement for identifying the tumor based on a whole-volume brain sample, it may be challenging or inefficient to segment the tumor from brain to determine the location, extension, or shape of the tumor without extracting 3D patches from the whole-brain volume to reduce computation and memory requirement to delineate and identify the tumor using the machine learning technique.

The methods to automate the delineation of brain tumors can be broadly categorized in two groups including generative models that rely on prior knowledge about tissue appearance and distribution, and discriminative models, which directly learn the relationship between the image features and the segmentation labels. A generative modeling approach can be to treat tumor segmentation as an outlier detection problem, in which the diseased brain is registered to a healthy brain atlas and then lesions are detected based on deviations in tissue appearance between the atlas and the registered brain. A discriminative approach, on the other hand, can include local feature extraction (e.g. intensity histogram of neighboring voxels or local intensity differences) followed by training of a classification algorithm (such as Support Vector Machine or Random Forest) that estimates a mapping function between the extracted features and the target segmentation labels.

Delineation methods can include deep convolutional neural networks (CNNs). Given that the data for the task of brain tumor segmentation includes various patches of volumes sampled at fixed intervals in the 3D space, CNNs are efficient and topologically convenient for processing it, in addition to being suitable for their efficiency on this type of data—because of sparse interactions and parameter sharing properties—and their spatial equivariance properties, which are useful for learning invariant representations from imaging data.

However, these learning approaches can have limitations. First, providing sufficient spatial context to the learning method can be important for building a precise algorithm, however this is not sufficiently emphasized in virtually any of the proposed solutions. Because of computational constraints, these methods cannot be trained with full brain images or volumes, which limits the amount of context the network perceives. Because of that, the network can hardly take into account features like the relative position of the tumor with respect to other healthy parts of the brain or the global relationships between the different tumoral structures.

The amount of data is arguably not enough to represent the variability of such pathology, meaning that the proposed algorithms do not have sufficient generalization power. Third, translation from academic research to industry and eventually clinical practice is not straightforward. The present solution includes different convolutional architectures in order to solve the tumor segmentation problem, focusing on spatial context awareness, precision and efficiency.

At least one aspect is directed to a method of tumor segmentation. The method can be performed by a computer system having one or more processors and memory. The method can include receiving data representing an input volume having dimensions of a first size and a first kernel size. The method can include producing a residual volume from the received input volume having dimensions of the first size. The method can include convolving, to a first intermediate residual volume, a first dimension of the residual volume to size of 1. The method can include convolving, to a second intermediate residual volume, a second dimension of the residual volume to size of 1. The method can include convolving, to a third intermediate residual volume, a third dimension of the residual volume to size of 1. The method can include summing the first intermediate residual volume, the second intermediate residual volume, and the third intermediate residual volume to create a first global volume having dimensions of a second size and a second kernel size. The method can include producing a downsampled volume having dimensions of a third size and a third kernel size from the received input volume, wherein dimensions of the third size comprises dimensions of half the first size and the third kernel size is double the first kernel size. The method can include producing a residual downsampled volume from the downsampled volume having dimensions of the third size and the third kernel size. The method can include convolving, to a first intermediate downsampled volume, a first dimension of the downsampled volume to size of 1. The method can include convolving, to a second intermediate downsampled volume, a second dimension of the downsampled volume to size of 1. The method can include convolving, to a third intermediate downsampled volume, a third dimension of the downsampled volume to size of 1. The method can include summing the first intermediate downsampled volume, the second intermediate downsampled volume, and the third intermediate downsampled volume to create a second global volume having dimensions of a fourth size and the second kernel size. The method can include upsampling the created second global volume having dimensions of the fourth size to increase the dimension size to dimensions of the second size. The method can include integrating the first global volume and the second global volume to create an output volume having dimensions of the second size and the second kernel size.

At least one aspect is directed to a system of tumor segmentation. The system can include a computer. The computer can include one or more processors and memory. The computer can receive data representing an input volume having dimensions of a first size and a first kernel size. The computer can produce a residual volume from the received input volume having dimensions of the first size. The computer can convolve, to a first intermediate residual volume, a first dimension of the residual volume to size of 1. The computer can convolve, to a second intermediate residual volume, a second dimension of the residual volume to size of 1. The computer can convolve, to a third intermediate residual volume, a third dimension of the residual volume to size of 1. The computer can sum the first intermediate residual volume, the second intermediate residual volume, and the third intermediate residual volume to create a first global volume having dimensions of a second size and a second kernel size. The computer can produce a downsampled volume having dimensions of a third size and a third kernel size from the received input volume, wherein dimensions of the third size comprises dimensions of half the first size and the third kernel size is double the first kernel size. The computer can produce a residual downsampled volume from the downsampled volume having dimensions of the third size and the third kernel size. The computer can convolve, to a first intermediate downsampled volume, a first dimension of the downsampled volume to size of 1. The computer can convolve, to a second intermediate downsampled volume, a second dimension of the downsampled volume to size of 1. The computer can convolve, to a third intermediate downsampled volume, a third dimension of the downsampled volume to size of 1. The computer can sum the first intermediate downsampled volume, the second intermediate downsampled volume, and the third intermediate downsampled volume to create a second global volume having dimensions of a fourth size and the second kernel size. The computer can upsample the created second global volume having dimensions of the fourth size to increase the dimension size to dimensions of the second size. The computer can integrate the first global volume and the second global volume to create an output volume having dimensions of the second size and the second kernel size.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTIONS OF THE DRAWINGS

The accompanying drawings are not intended to be drawn to scale. Like reference numbers and designations in the various drawings indicate like elements. For purposes of clarity, not every component may be labeled in every drawing. In the drawings.

Figure 3:
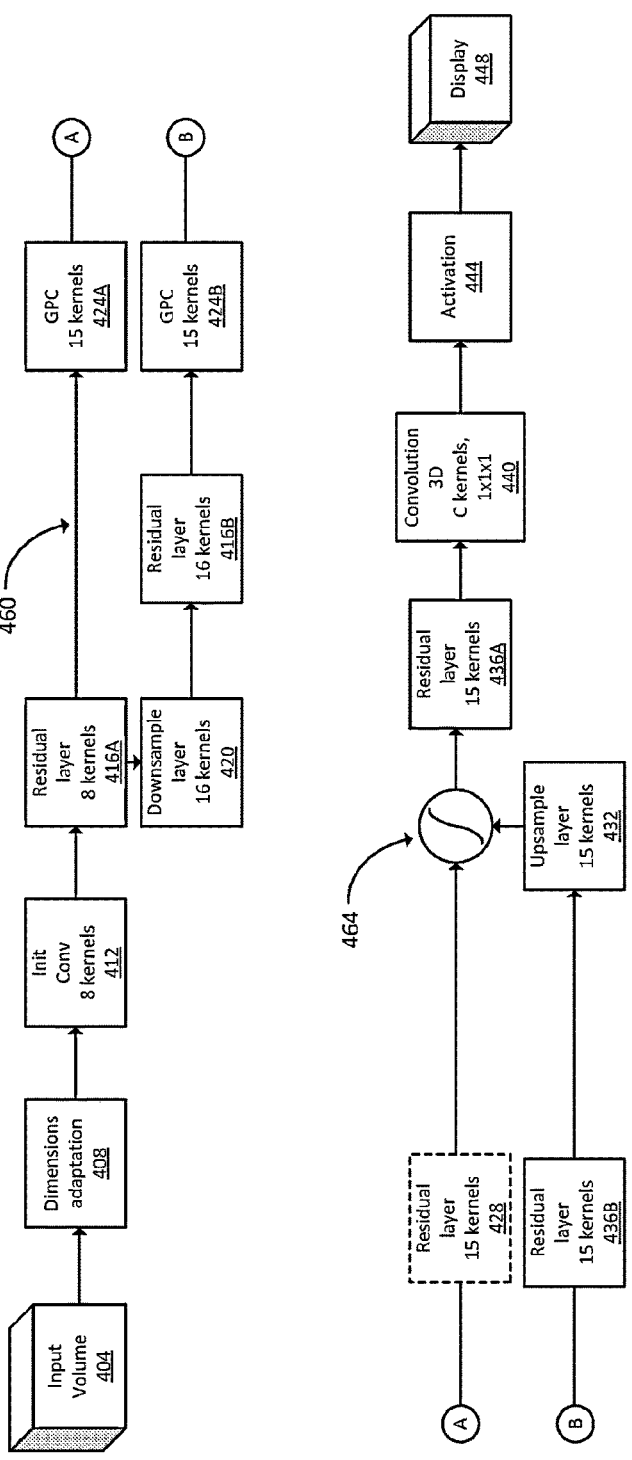
FIG. 3 illustrates an example convolutional neural network architecture.

FIGS. 4A-F illustrates example detail of convolutional neural network architecture of FIG. 3.

Figure 5:
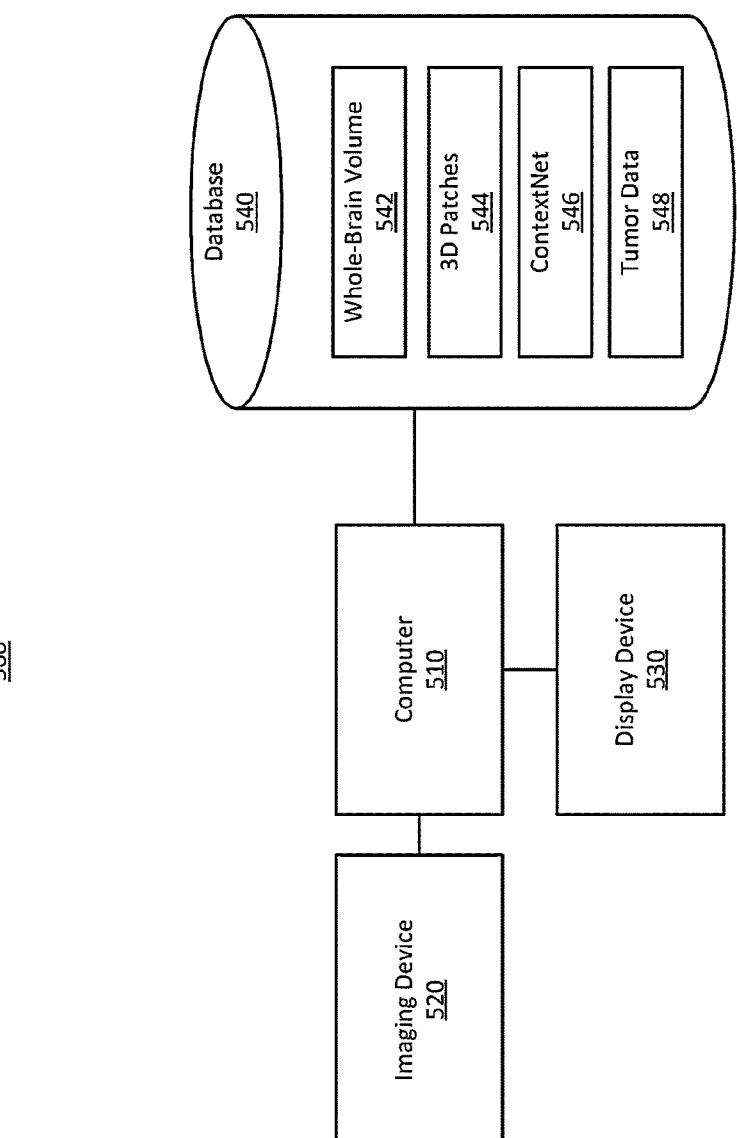

FIG. 5 illustrates a block diagram of an example system to execute the convolutional neural network architecture.

Figure 6:
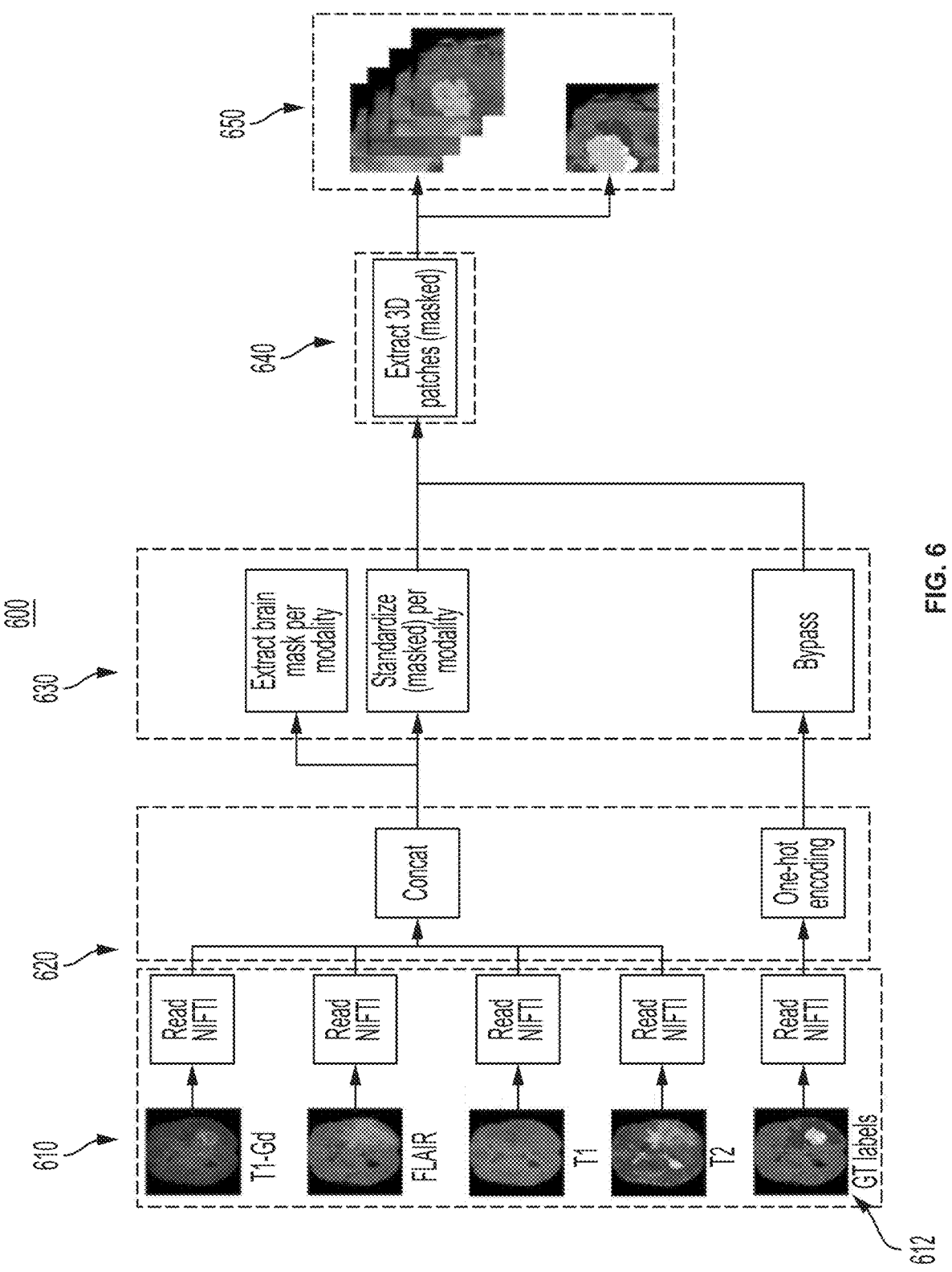

FIG. 6 illustrates an exemplary diagram of the steps taken by a preprocessing pipeline to process image data.

Figure 7:
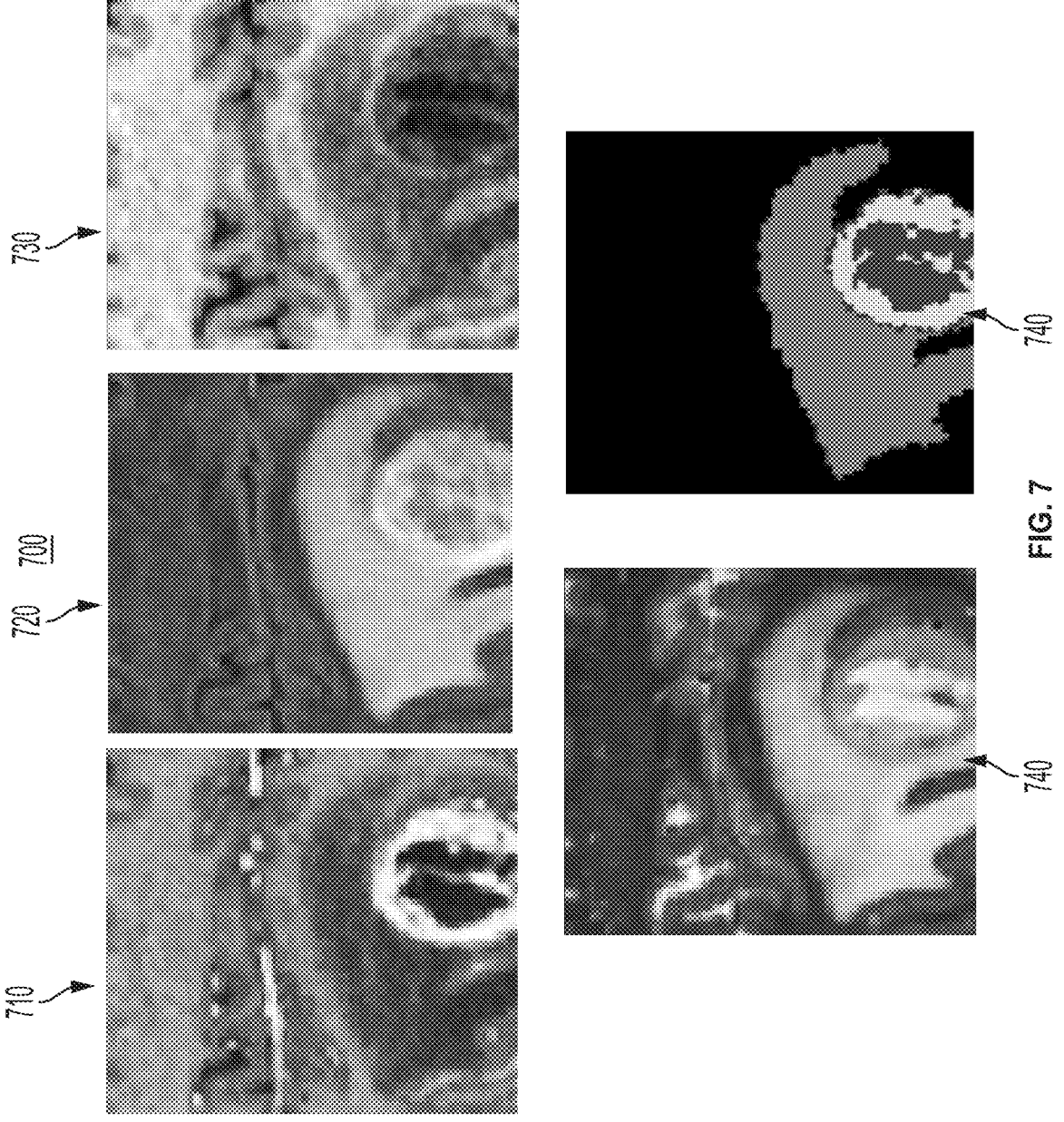

FIG. 7 illustrates an axial representation of an example patches of imaged brain tissue.

Figure 8:
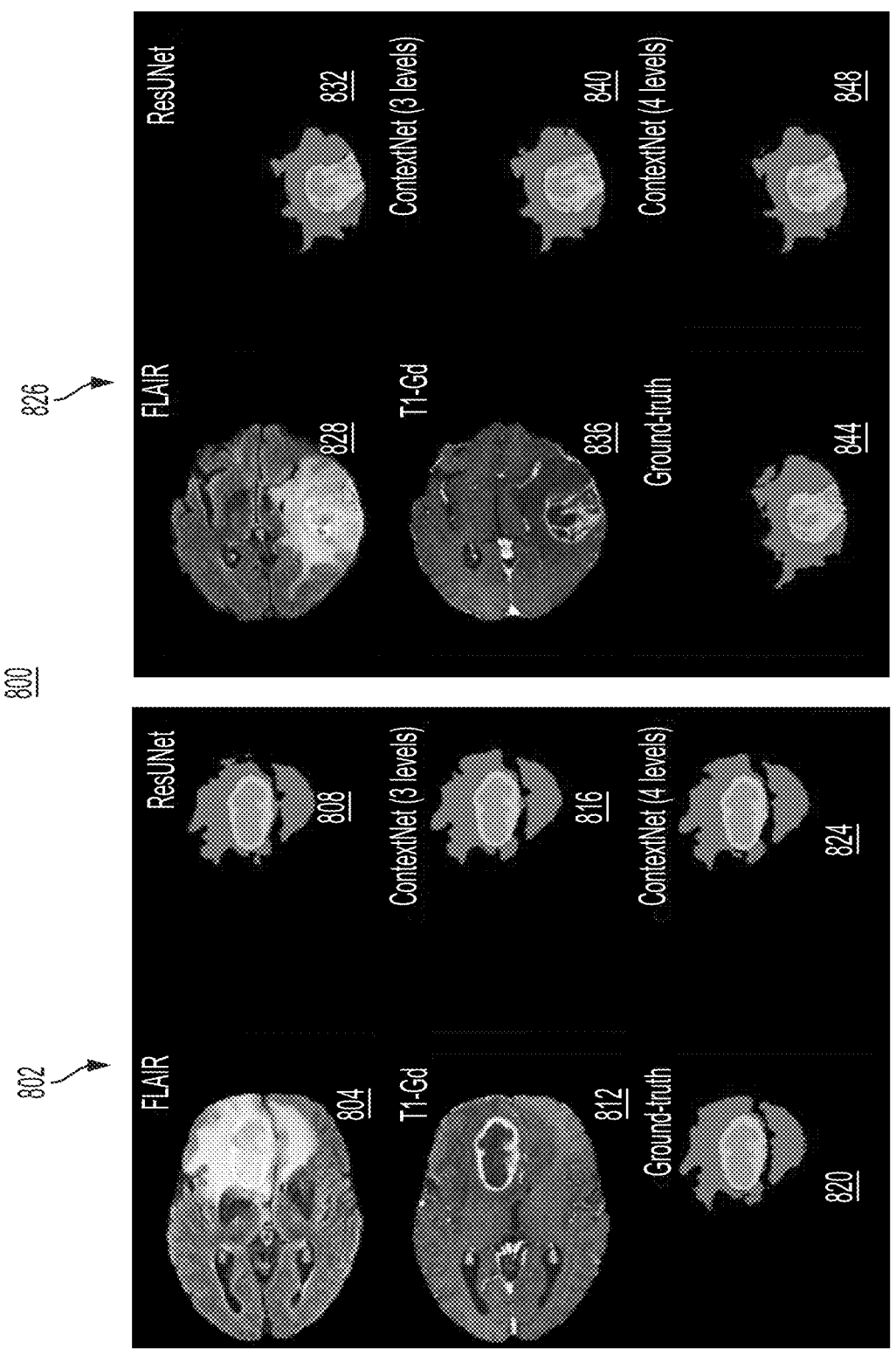

FIG. 8 illustrates an axial representation of an example brain tumor imaged by two different convolutional neural network architectures.

DETAILED DESCRIPTION

The present solution can automate the delineation and identification process on MR images and enable the acceleration of treatment planning and improve treatment follow-up. For example, the present solution can address the problem of defining the lesion areas only through intensity changes relative to the surrounding normal tissue. These intensity gradients may be smoothed or obscured due to partial volume effects, low resolution acquisitions, or bias field artifacts. Another problem addressed by the present solution is that tumors can appear and expand at any location within the brain and exhibit any shape and size, which obscure the use of prior information related to the tumor location or extension. The types of tumor can include enhancing tumor, peritumoral edema, and necrotic and non-enhancing tumor. Another problem addressed by the present solution is that normal tissue displacement, due to the growing tumor lesion (also known as mass effect) or due to a resection cavity after treatment, limits the amount of spatial prior information about the healthy tissue of the brain. This in turn limits the effectiveness of methods that assume healthy tissue location—e.g. with a brain atlas—to model a healthy brain in order to detect the diseased regions. Another problem addressed by the present solution is that the variety of tumor types and their aggressiveness is reflected on the heterogeneity of the appearance of tumors in MR images, making the use of prior information about relative appearance between tumor substructures difficult. For instance, while High Grade Gliomas demonstrate a high degree of tumor heterogeneity and contrast enhancement, Low Grade Gliomas may present some degree of contrast enhancement in only 60% of the cases.

MR imaging can be performed based on magnetization properties of atomic nuclei. The protons are normally oriented in a plurality of directions. An external magnetic field can be introduced to align the protons located within the water nuclei of the brain tissue. For example, the protons are normally oriented to travel in up, down, left, right, or any direction in between. By introducing the external magnetic field, the protons can be oriented to travel in up and down, left and right, front and back, or other directions perpendicular to the introduced magnetic field. The proton alignment can then be disrupted or perturbed by a radio frequency (RF) energy. The disruption can revert the proton alignment to their normally oriented directions. By reverting the proton alignment, RF energy can emit for collection and measurement. The time for reverting the proton alignment can be referred to as relaxation time, which can be utilized to characterize the brain tissue. The measured RF energy can be converted, via Fourier Transformation using the frequency information of the RF energy, to a plurality of intensity levels for generating at least one monochrome MR image. The intensity levels correspond to a lighter or darker portion of the MR image.

Figure 1:
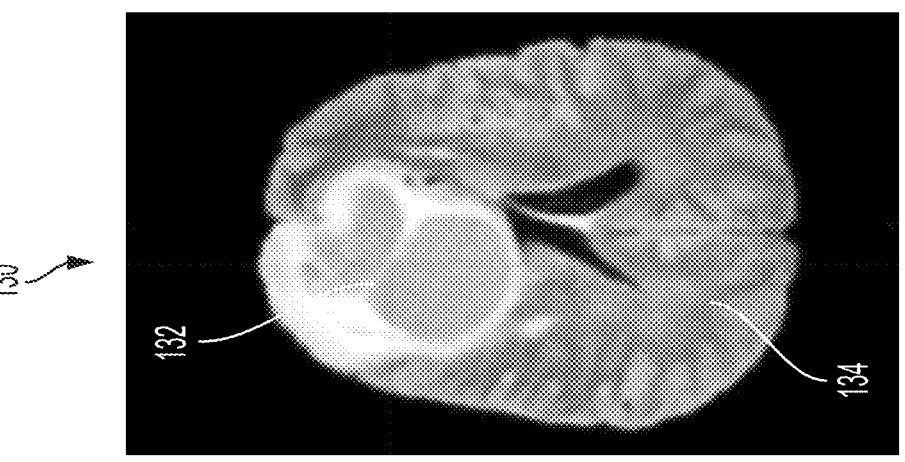
FIG. 1 illustrates axial slices of T2-FLAIR acquisitions of 3 different samples of brain tissue with tumors of variable grade.
Figure 1:
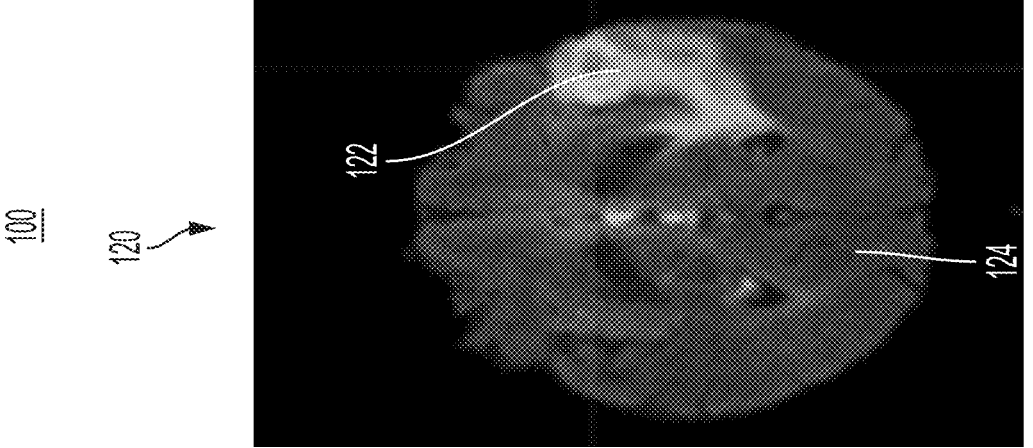
Figure 1:
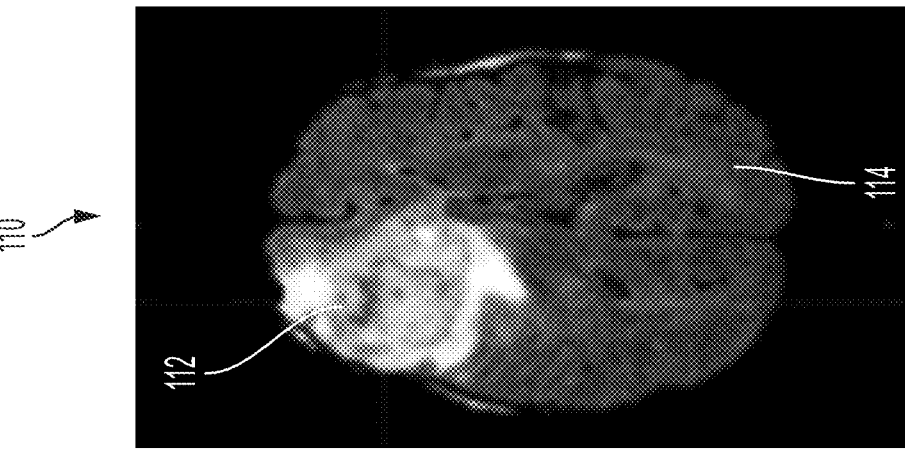

FIG. 1 illustrates axial slices 100 of T2-FLAIR acquisitions of 3 different samples of brain tissue with tumors (e.g. glioma) of variable grade. The axial slices 100 present a 2D top-down perspective of the brains. The axial slices 100 can include a first image 110, a second image 120, and a third image 130, each representing a different brain with tumor. The tumor location, extension, and shape can be highly heterogeneous. The distinction between the first image 110, the second image 120, and the third image 130, can demonstrate the difficulty of automating the delineation and identification process on MR images based on the tumor location, extension, and shape. The tumor can be situated in a plurality of locations including at least the frontal lobe, superior frontal sulcus, middle frontal gyrus, precentral sulcus, precentral gyrus, central sulcus, postcentral gyrus, postcentral sulcus, parietal lobe, occipital lobe, cerebellum, temporal lobe, lunate sulcus, and/or a combination thereof. The extension can be referred to as a size, dimension, or prolongation of the tumor, for example, the tumor extending from the frontal lobe to the central sulcus of the brain. The tumor can include various shapes, such as a spherical, ovoid, spheroid, circular, and/or ellipse. The tumor shape can alter over time, for example, an MR image identifies a spherical tumor in the frontal lobe of the brain and subsequently, after 30 hours, identifies the tumor as an ovoid extending from the frontal lobe to the middle front gyrus of the brain.

The first image 110 illustrates a first glioma 112 covering the left hemispheric frontal lobe. The second image 120 illustrates a second glioma 122 extending from parietal lobe to a portion of the right hemispheric frontal lobe. The third image 130 illustrates a third glioma 132 covering the left hemispheric frontal lobe and extending to the right hemispheric frontal lobe. The MR images can display bright or contrasted coloration in the axial slices 100 to distinguish between healthy brain tissue and abnormal tissue (e.g. tumor), for example, the healthy brain tissue can be the dark portions of the brain, as seen in portions 114, 124, and 134, whereas the abnormal tissue can be the lighter portions of the brain, as seen with the first glioma 112, the second glioma 122, and the third glioma 132. The portions 114, 124, and 134 can be referred to as, and used interchangeably with other descriptive terms, such as healthy brain tissue or normal tissue. In some cases, such as shown in the third image 130, the healthy brain tissue 134 and the abnormal tissue (e.g. the third glioma 132) can exhibit similar coloration. Due to the similar coloration, the third glioma 132 may not be apparent from the healthy brain tissue 134 to automatically delineate and identify the tumor.

In one embodiment, the tumor can be hidden in a sublayer of the brain, such that the normal tissue encloses the tumor and suppresses the coloration of the hidden tumor, as in the second image 120. For example, the first image 110 displays the healthy brain tissue 114 with 10 lux (lx) and the first glioma 112 with 40 lx. The second image 120 displays the healthy brain tissue 124 with similar intensity to the first image 110 and displays the second glioma 122 with 20 lx. The second glioma 122 providing similar intensity as the healthy brain tissue 124 may hinder the delineation and identification process for determining the appearance and location of the tumor on the MR image.

The first glioma 112 of the first image 110, situated in the left hemispheric frontal lobe, can displace or generate a new or additional portion of the tumor. The new or additional portion of the first glioma 112 can transform or convert to a different location, extension, and shape. The transformed or converted first glioma 112 can exhibit similar appearance to and/or situated in similar location as, for example, the third glioma 132 of the third image 130, such that the first glioma 112 is situated in at least two portions of the brain similar to the third glioma 132 0. The presence of intra and inter-variability in MR image appearance can further increase the difficulty of automatic tumor delineation problem. For example, a portion of the first glioma 112 can augment into the sublayer of the brain, such that the augmented portion is hidden from the first image 110. To identify the augmented portion of the first glioma 112 or an extension of the tumor to the sublayer of the brain, additional MR image(s) is required due to the amount of spatial information.

Figure 2:
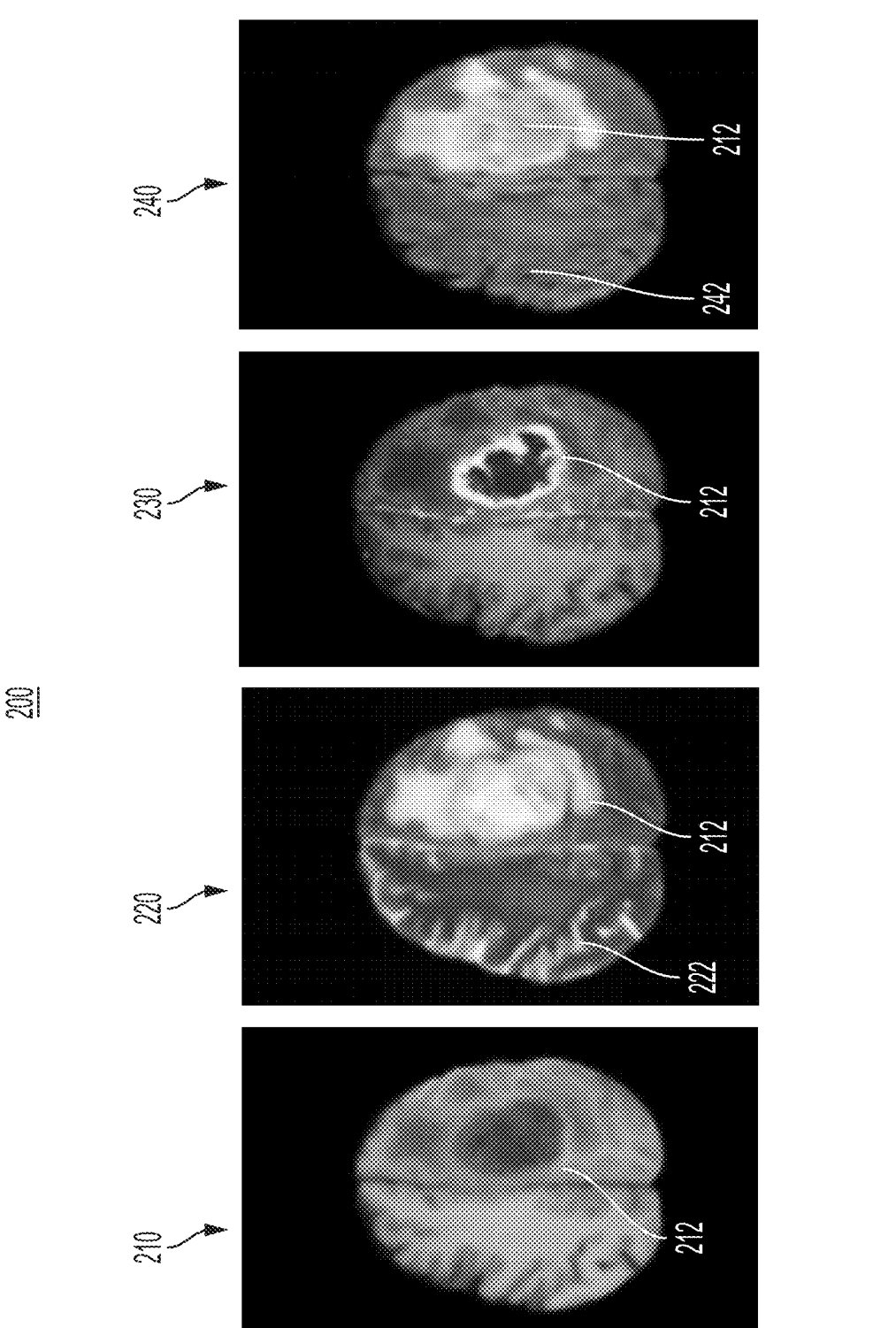
FIG. 2 illustrates axial slices of T1-weighted acquisitions, T2-weighted acquisitions, T1 Gadolinium enhanced acquisitions, and T2-FLAIR acquisitions of brain tissue.

FIG. 2 illustrates axial slices 200 of T1-weighted acquisitions, T2-weighted acquisitions, T1 Gadolinium enhanced acquisitions, and T2-FLAIR acquisitions of brain tissue. The various acquisitions of brain tissue can be referred to as MRI modalities. The axial slices 200 present a 2D top-down perspective, similar to FIG. 1. The axial slices 200 includes a first image 210, a second image 220, a third image 230, and a fourth image 240, all of which are the same brain using various MR modalities. The axial slices 200 further includes the same glioma 212 in the MR images. The MR modalities can include T1-weighted, T2-weighted, FLAIR, and contrast enhanced T1 (Gadolinium contrast), abbreviated as T1-Gd. The MR modalities can refer to, and use interchangeably with other descriptive terms, such as protocols, modes, and methods of MR imaging. The MR modalities can each emphasize different healthy and abnormal tissues, such as to highlight or conceal one or more portions of the brain. For example, the T1-Gd modality can include Gadolinium contrast injected intravenously and at the administered concentrations to initiate an effect of reducing T1 relaxation time, which increases T1 signal.

The MR modalities can be differentiated by Repetition Time (TR) and Time to Echo (TE). The TR represents a time between successive pulse sequences that are applied to the same axial slice 200. The time between successive pulse sequences can be, for example, 200 millisecond (ms), 3330 ms, or 4505 ms. The TE represents a time between delivery of the RF pulse and the receipt of the echo signal. The mentioned TE time can be, for example, 13 ms, 55 ms, or 94 ms. Each MR modalities can be based on different relaxation times. The relaxation times referring to the duration for the aligned protons to revert back to a resting or normal orientation. The resting or normal orientations can refer to the orientations of the protons prior to applying the external magnetic field, such that the protons resume to travel in random directions.

T1 can refer to a longitudinal relaxation time. T1 represents a time constant to determine a rate for excited protons to return to equilibrium. The protons can be excited by, for example, applying a magnetic field to align and orient the protons in a direction and an opposite direction. In further definition, T1 is a time measurement for spinning protons to realign with the external magnetic field. T2 can refer to a traverse relaxation time. T2 represents a time constant to determine the rate for the excited protons to reach equilibrium or depart from the phases of other protons. The time constant of T2 measures a time for spinning protons to lose phase coherence from the nuclei spinning perpendicularly to the applied magnetic field.

The first image 210 includes the glioma 212 situated in the right hemispheric parietal lobe of the brain. The first image 210 uses T1-weighted protocol to enhance the MR image. T1-weighted protocol can be based on T1-relaxation properties. The T1-relaxation properties can refer to the time measurement for the spinning protons to realign with the external magnetic field, as described previously. With the T1-relaxation properties, T1-weighted protocol can approximate the anatomy of an organ of interest. T1-weighted protocol can generate the first image 210 with various intensities based on different types of matter. For example, the first image 210, using T1-weighted protocol, can display fluids, such as CSF, with low intensity value, such as 5 lux (lx), 13 lx, or 18 lx. The fluids, as in the first image 210, can feature the glioma 212. The first image 210 can further display white matter with high intensity value, such as 100 lx, 120 lx, or 133 lx, and display gray matter with intermediate intensity value, such as 50 lx, 66 lx, or 70 lx. The intermediate intensity can refer to an intensity value greater than the low intensity value, but less than the high intensity value. As an example, the first image 210 displays the glioma 212 with low intensity value, and different portions of the brain with intermediate and high intensity value.

However, the low intensity value, as in the example, is subtle relative to the different portions of the brain, such that the glioma 212 may not be easily distinguished from the healthy portions of the brain (e.g. the different portions with intermediate and/or high intensity values).

The second image 220 includes the same glioma 212 as the first image 210. The second image 220 uses T2-weighted protocol to enhance the MR image. T2-weighted protocol can be based on T2-relaxation properties. The T2-relaxation properties can refer to the time measurement for the spinning protons to lose phase coherence from the nuclei spinning perpendicularly to the applied magnetic field. T2-weighted protocol, given the T2-relaxation properties, can display the second image 220 with inverse intensity value to the first image 210. For example, the second image 220 can exhibit the fluids (e.g. the glioma 212 or edema, which refers to abnormal accumulation of fluids in certain tissue of the brain) as high intensity value, the gray matter as intermediate intensity value, and the white matter as low intensity value. As demonstrated in the second image 220, the glioma 212 appears with higher intensity than the healthy portions of the brain, such that the healthy portions of the brain appear with low intensity value enclosing the glioma 212.

The third image 230 includes the same glioma 212 as the first image 210 and the second image 220. The third image 230 uses T1-Gd protocol to enhance the MR image. T1-Gd protocol can include Gadolinium (Gad), which is a non-toxic paramagnetic contrast enhancement agent. The Gad can be used to shorten the longitudinal relaxation time (e.g. T1) for configuring the signal intensities. The Gad can be injected intravenously and at a medically appropriate concentration, such as to reduce T1 relaxation time for an increase in T1 signal. The increased T1 signal can cause the Gad to appear very bright. For example, T1-Gd protocol can induce perimeters of the glioma 212 of the third image 230 to appear brighter than the healthy tissue and the central portions of the glioma 212. The perimeters can refer to the contour of the glioma 212. By highlighting the contour of the glioma 212, the glioma 212 can distinguish from the healthy brain tissue in the third image 230 of the axial slices 200. T1-Gd protocol can highlight vascular structures and breakdowns in the blood-brain barrier [e.g. tumor, abscesses, inflammation (herpes simplex encephalitis, multiple sclerosis, etc.)].

The fourth image 240 includes the same glioma 212 as the first image 210, second image 220, and third image 230. The fourth image 240 uses T2-FLAIR protocol to enhance the MR image. T2-FLAIR protocol can be similar to the T2-weighted protocol, but with extended TE and TR times from the T2-weighted protocol. For example, T2-weighted protocol can include a TR time of 3400 ms and a TE time of 79 ms, whereas the T2-FLAIR protocol can include a TR time of 7900 ms and a TE time of 109 ms. The extended TE and TR times of T2-FLAIR protocol can maintain the abnormal portions of the brain (e.g. the glioma 212) with high intensity value but diminish the CSF fluids intensity value to the low intensity value. The CSF fluids, as in the fourth image 240, can refer to normal fluids residing in the portions of the brain, different from the glioma 212. For example, the perimeter 242 of the fourth image 240 displays the fluids with low intensity value in comparison to the perimeter 222 of the second image 220 with high intensity value. The fourth image 240 and the second image 220, as in this example, displays the glioma 212 with high intensity value. By distinguishing abnormalities and normal fluids, the glioma 212 of the fourth image 240 can appear prominent from the healthy tissue of the brain.

FIG. 3 illustrates an example convolutional neural network architecture 300. Convolutional neural network (CNN) architecture 300 can refer to a machine learning or artificial intelligence (AI) architecture. CNN architecture 300 can be 3D and fully-convolutional, meaning that the architecture can utilize 3D patches of data for providing images of segmented tumor for at least one display 448. CNN architecture 300 can provide interference with the whole-brain volume. CNN architecture 300 can include various layers, such as dimensions adaptation layer 408, initialize convolution 412, residual layer 416A-B/428/436A-B, downsample layer 420, Global Planar Convolution (GPC) layer 424A-B, upsample layer 432, convolution layer 440, and activation layer 444. The various layers can refer to, and use interchangeably with other descriptive terms, such as filtering block, coating block, or configurator. The various layers can be configured with a number of kernels, such as 8 kernels, 15 kernels, or 30 kernels. The number of kernels or filters can refer to a kernel size.

CNN architecture 300 can receive or retrieve an input volume 404 including one or more 3D patches of data from, for example, the data ingestion pipeline, the database, or a cloud via a network. The input volume 404 can include predetermined dimensions, such as the length, width, and height of the 3D patches of data. The 3D patches of data can include the various modalities, including T1-weighted, T2-weighted, T1-Gd, and T2-FLAIR. In one embodiment, the received or retrieved input volume 404 can be of different dimensions. For example, the input volume 404 can include dimensions of $100 \times 100 \times 100$ cm$^3$, $150 \times 150 \times 150$ cm$^3$, or $200 \times 200 \times 200$ cm$^3$.

The input volume 404 can be passed through the layers of CNN architecture 300 for display 448. The display 448 can include a display device, such as an LCD display, LED display, or other types of computer screen to illustrate the extracted tumor of the brain. The display 448 can communicate with the display device via at least a cable connection, wireless connection, or satellite connection. In one embodiment, the CNN architecture 300 can provide the extracted tumor of the brain to at least one external hardware or software. The external hardware or software can compare the extracted tumor to an expected tumor stored in a database corresponding to the external hardware or software. The comparison of the extracted tumor of CNN architecture and the expected tumor of the external hardware or software can be further compared to a different extracted tumor of a different architecture.

In one embodiment, CNN architecture 300 can receive the input volume 404 having dimensions of a first size and a first kernel size. The input volume can pass through the various layers of the CNN architecture 300 for displaying at least one image of the segmented tumor via the display 448. The input volume 404 can further pass through the various layers of the CNN architecture 300 in a consecutive order. For example, the input volume 404 can pass through the dimensions adaptation layer 408 to produce an adapted volume having dimensions of the first size and the first kernel size. The adapted volume can pass through the initialize convolution layer 412 to produce an initialized volume having dimensions of the first size and the first kernel size. The initialized volume can pass through the residual layer 416A to produce a first volume to produce a residual volume having dimensions of the first size and the first kernel size.

Continuing from the previous example, the residual volume can pass through the GPC layer 424A to produce a first global volume having dimensions of a second size and a second kernel size. Dimensions of the second size and the second kernel size can be based on a desired output dimensions and image quality. For example, CNN architecture can configure the kernel size of the GPC layer 424A/424B to 15 kernels to produce dimensions of the second size, such as $80 \times 80 \times 80$ cm$^3$, $100 \times 100 \times 100$ cm$^3$, or $120 \times 120 \times 120$ cm$^3$. In some cases, CNN architecture 300 can automatically determine the kernel size of the GPC layer 424A/424B based on the received or retrieved input volume 404. For example, CNN architecture 300 can determine to increase the kernel size of the GPC layer 424A/424B based on the input volume 404 dimensions reaching a threshold. The threshold can be dimensions of size, for example, $300 \times 300 \times 300$ cm$^3$, $400 \times 400 \times 400$ cm$^3$, or $500 \times 500 \times 500$ cm$^3$.

Further continuing from the previous example, the residual volume can further pass through the downsample layer 420 to produce a downsampled volume having dimensions of a third size and a third kernel size. Dimensions of the third size can be halve of dimensions of the first size and the third kernel size can be double the first kernel size, for example, The downsampled volume can pass through the residual layer 416B to produce a residual downsampled volume having dimensions of the third size and the third kernel size. The residual downsampled volume can pass through the GPC layer 424B to produce a second global volume having dimensions of a fourth size and the second kernel size. The second global volume can pass through the residual layer 436B to produce a residual second global volume having dimensions of the fourth size and the second kernel size. The residual second global volume can pass through the upsample layer 432 to increase dimensions of the fourth size to dimensions of the second size. The residual second global volume can concatenate 464 with the first global volume to create an output volume having dimensions of the second size and the second kernel size.

Still continuing from the previous example, the output volume having dimensions of the second size and the second kernel size can pass through the residual layer 436A, the convolution layer 440, and activation layer 444 to provide the display 448 with at least one image of the segmented tumor. The convolution layer 440 can include a kernel of size $1 \times 1 \times 1$. In some cases, the mentioned example can refer to an order or a plurality of steps for passing the input volume 404 through the various layers of the CNN architecture 300 for the display 448. In some other cases, the various layers of CNN architecture 300 can be rearranged with suitable ordering based on, for example, a determination of better delineation and tumor segmentation process from rearranging the layers order and/or locations. The layers of CNN architecture 300 can be rearranged prior to passing the input volume 404 through the dimensions adaptation layer 408. Additionally, the layers of CNN architecture 300 can be dynamically rearranged, for example, CNN architecture 300 can rearrange the layers concurrent to passing the input volume 404 through at least one layer prior to a rearranged layer portion of CNN architecture 300.

In one embodiment, the GPC layer 424A can reside in a skip-connection 460 of the CNN architecture 300. The skip-connection 460 can refer to at least, but not limited to, the path between the residual layer 416A and the residual 436A, for example. The skip-connection 460 can perform at least one mapping function, such as identity mapping. CNN architecture 300 can pass the residual volume and the residual downsampled volume through the GPC layer 424A/424B concurrently or simultaneously. The passing of two or more volume through the layer concurrently or simultaneously can expedite the filtering process through the various layers of CNN architecture 300.

The dimensions adaptation layer 408 can configure or adjust the dimensions of the input volume 404. The configuration or adjustment can be performed using various resizing, cropping, or other filtering techniques. Resizing can include to stretching or compressing various dimensions of an image. Cropping can include subtracting, parting, or breaking off one or more portions of the image. The dimensions adaptation layer 408 can include a predetermine dimensions to adapt the input volume 404. In one embodiment, the CNN architecture can configure or adjust the dimensions for the dimensions adaptation layer 408 to adapt the input volume 404. The adaptive dimensions configuration or adjustment can be based on the volume dimensions preferred for passing to the next layer. For example, the initialize convolution layer 412 may prefer to receive uniform dimensions of $100\times100\times100$ cm$^3$. The dimensions adaptation layer 408, receiving an input volume 404 of $200\times80\times100$ cm$^3$ (L×W×H), can adjust the dimensions of the input volume 404 by decreasing the length from 200 cm to 100 cm and increasing the width from 80 cm to 100 cm using at least one filtering technique to produce the $100\times 100\times100$ cm$^3$ volume. The filtering technique can perform at least a convolution function or correlation function. The layers of FIG. 3 can be provided in greater detail in FIG. 4A-F, as described herein.

Figures 4A, 4B:
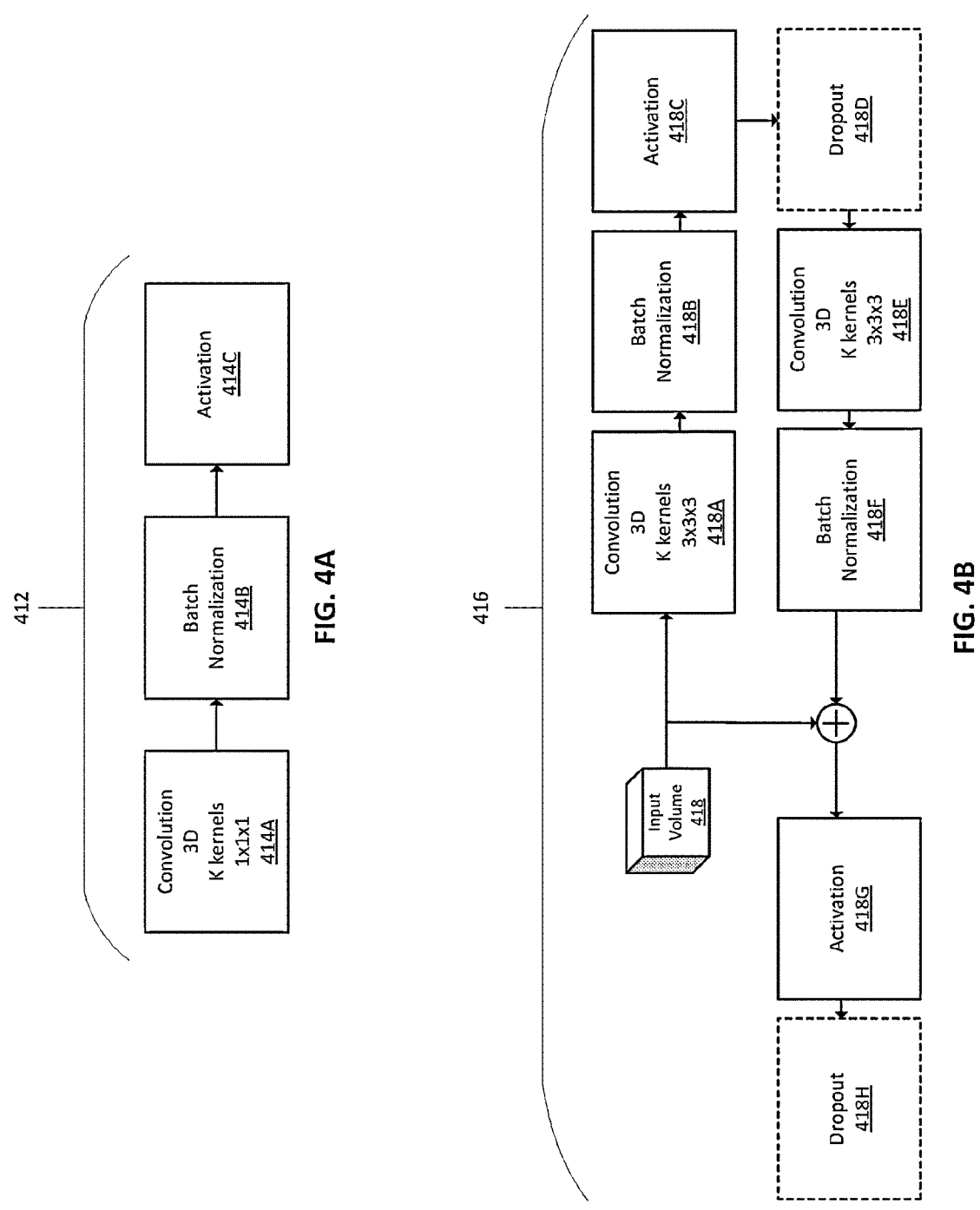

FIG. 4A illustrates the initialize convolution 412 in greater detail. The initialize convolution 412 can include a convolution layer 414A, batch normalization layer 414B, and activation layer 414C. The initialize convolution 412 can receive or retrieve an input, such as the adapted input volume 404 via the dimensions adaptation layer 408. The convolution layer 414A can be configured with the kernels previously mentioned in the CNN architecture 300. The convolution layer 414A can perform a convolution using $1\times1\times1$ kernel or filter to configure the dimensionality of the volume. The batch normalization layer 414B can normalize the convolved volume to output a normalized volume. The batch normalization layer 414B can configure the convolved volume to be zero-centered, such that the values corresponding to the image resides closer to zero. The values can refer to an RGB value or signal corresponding to the pixels of the received volume. The activation layer 414C can produce an activated volume by transforming the normalized volume values to a plurality of non-linear values. For example, the activation layer 414C can transform the negative values of the volume to zero and maintain the non-negative values of the volume.

FIG. 4B illustrates the residual layer 416 in greater detail. The residual layer 416 can be the residual layer 416A-B, 428, and 436A-B, with modification. The residual layer can receive the input volume 418 from, for example, the initialized input volume 404 via the initialize convolution layer 412. The residual layer 416 can include convolution layers 418A/418E, batch normalization layers 418B/418F, and activation layers 418C/418G. The convolution layers 418A/418E can be similar to the convolution layer 414A of the initialize convolution layer 412 with different kernel dimensions. The residual layer 416 can configure the kernel dimensions of the convolution layers 418A/418E to a $3\times3\times3$ kernel. The batch normalization layers 418B/418F and the activation layers 418C/418G can be similar to the corresponding layers of FIG. 4B. The residual layer 416 can maintain the received input volume 418 as a first volume 418.

The residual layer 416 can pass the volume through each layer sequentially. For example, the volume can pass through the convolution layer 418A, the batch normalization layer 418B, the activation layer 418C, the convolution layer 418E, and the batch normalization layer 418F sequentially. The batch normalization layer 418F, responsive to normalizing the received convolved volume via the convolution layer 418E, can produce a second volume. The residual layer 416 can sum the first volume 418 and the second volume to produce a third volume. The third volume can refer to an intermediate residual volume. The residual volume can further pass the third volume through the activation layer 418G to produce a residual volume.

In one embodiment, the residual layer 416 can further include dropout layers 418D/418H. Each of the dropout layers 418D/418H can reside subsequently to the activation layers 418C/418G. For example, the dropout layer 418D can reside after activation layer 418C and the dropout layer 418H can reside after activation layer 418G. The dropout layers 418D/418H can reduce overfitting, by using at least one regularization technique. Overfitting can refer to an analysis of at least one model that correspond too closely to a particular set of data (e.g. raw data), which fails to provide additional data or predict future observation. The regularization technique can perform averaging on the model to prevent complex co-adaptations on the data. The dropout layers 418D/418H can "dropout" or eliminate one or more portions of the noise introduced in the received volume. In another embodiment, the residual layers 428/436B may not include an activation layer 418G subsequent to the summing the first volume 418 and the second volume to produce the third volume, such as the residual layers 428/436B subsequent to the GPC layers 424A/424B.

Figures 4C, 4D:
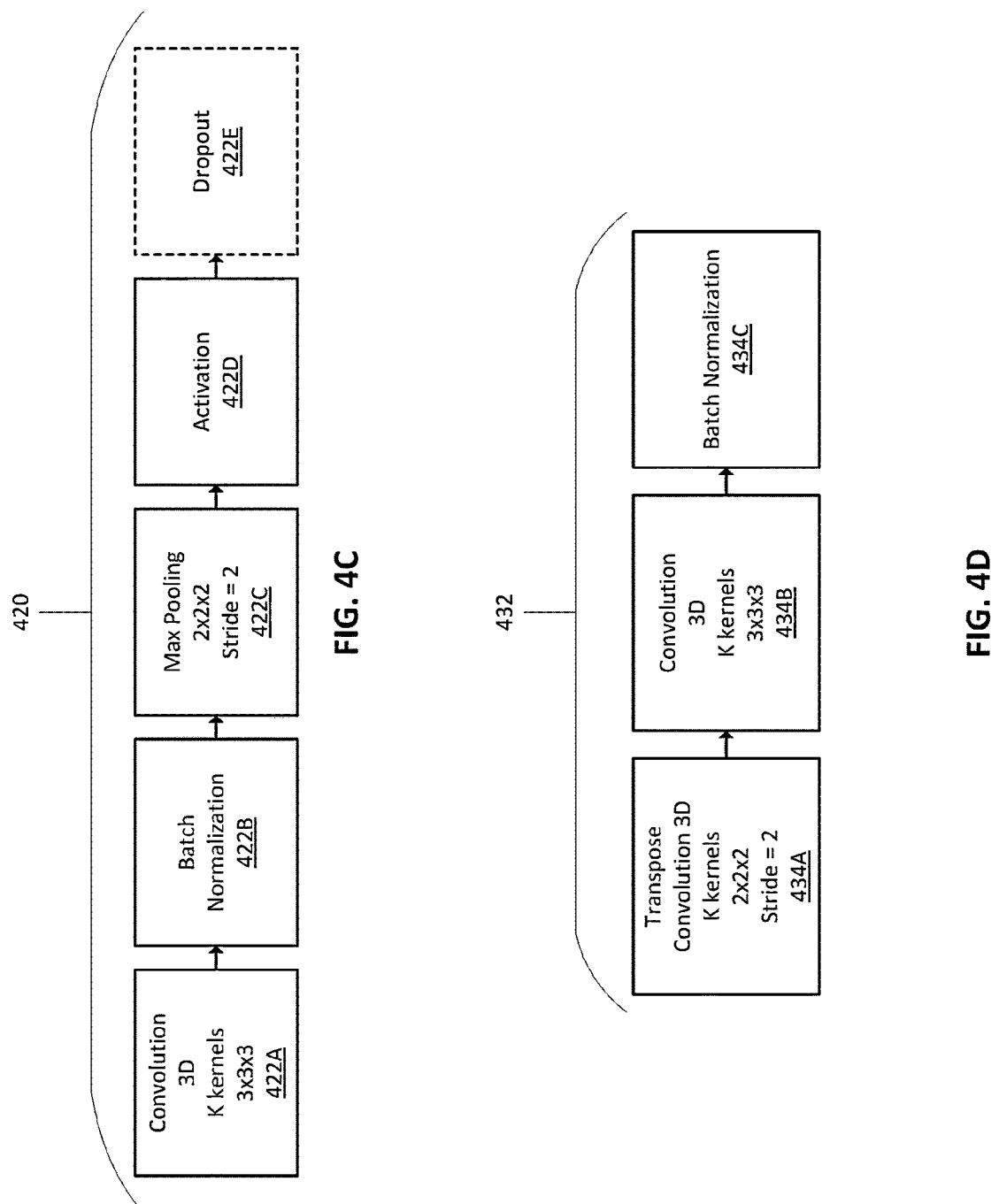

FIG. 4C illustrates the downsample layer 420 in greater detail. The downsample layer 420 can receive a volume, for example, via the residual layer 416. The received volume can refer to at least the residual volume from the residual layer 416, the input volume 404 pass through the various layers, or simply an input volume of the downsample layer 420. The downsample layer 420 can include a convolution layer 422A, a batch normalization layer 422B, a max pooling layer 422C, and an activation layer 422D. The convolution layer 422A can be similar to the convolution layer 418A/418E of the residual layer 416 with $3\times3\times3$ kernel dimensions, as seen in FIG. 4C. Similarly, the batch normalization layer 422B and the activation layer 422D can be similar to FIG. 1 and FIG. 2. The downsample layer 420 can provide the max pooling layer 422C, which can be subsequent to the batch normalization layer 422B. The max pooling layer 422C can include, for example, kernels of dimensions $2\times2\times2$ and stride of 2. The kernel dimensions of the max pooling layer 422C can represent the dimensions of the filter to configure the received volume. The kernel dimensions can define a pool of the max pooling layer 422C. The stride can represent a distance between two consecutive positions of a pooling window of the max pooling layer 422C along a dimension of the volume. In other words, the stride can represent the number of pixels to move the kernel for pooling the pixels for calculation.

The max pooling layer 422C can reduce the dimensions size by performing a max pooling operation based on the kernel dimensions and the stride value. For example, and using 2D matrix for simplicity, not as a limitation, an input volume of $4\times4$ dimensions can be reduced to an output volume of $2\times2$ dimensions using max pooling with $2\times2$ kernel dimensions and stride of 2. The $2\times2$ kernel with stride of 2 can ensure that stepping of the kernel will not overlap.

Using the 2×2 kernel with stride of 2 on the 4×4 input volume, the max pooling layer 422C can slide the kernel window from the upper-left, upper-right, lower-left, and lower-right corner of the input volume. Each of the kernel position can represent a pool for determining a max value to generate the output volume. The output volume can be a different from the input volume, to maintain original values of the input volume for executing the max pooling operation. The max pooling layer 422C can provide the output volume with a corresponding highest value of each pool in the kernel position. As for this example, the kernel slides to 4 positions, thus providing a 1×1 volume to a corresponding corner of the output volume to form a 2×2 dimensions.

In one embodiment, the max pooling layer 422C can perform an average pooling operation. The average pooling operation can include the dimensions and the stride similar to the max pooling operation. Instead of providing, for example, an output volume with the highest value of each pool, as in max pooling operation, the average pooling operation performs averaging to the pool. For example, given a 2×2 pool with values of 1, 2, 3, and 4, the max pooling operation can choose a value of 4 to provide the output volume. The average pooling operation, on the other hand, sum the values and divide by the numbers of values. In this example, the average pooling operation can provide a value of 2.5 to the output volume (e.g. (1+2+3+4)/4=2.5).

In another embodiment, the downsample layer 420 can further include a dropout layer 422E. The dropout layer 422E can be subsequent to the activation layer 422D, similar to FIG. 4B. The dropout layer 422E can include similar process and functionality as described in FIG. 4B. The downsample layer 420 can pass an input volume through the layers in a subsequent manner. For example, the input volume can pass through the convolution layer 422A, the batch normalization layer 422B, the max pooling layer 422C, the activation layer 422D, and the dropout layer 422E, respectively.

The downsample layer 420 can reduce the dimensions size based on the kernel dimensions. The reduction in the dimensions size can subsequently increase the kernel size. The kernel size can refer to the number of kernels or filters in a given layer, such as the downsample layer 420. For example, the downsample layer 420 can receive an input volume of 4×4×4 from the residual layer 416A with a kernel size of 8. The max pooling layer 422C of the downsample layer 420 can halve the volume dimensions from 4×4×4 to 2×2×2. Subsequent to reducing the dimensions, the kernel size can double from 8 to 16. Doubling the kernel size subsequent to having the dimensions can preserve the time complexity per layer. The downsample layer can produce a downsampled volume having dimensions of a size less than the input volume dimensions and a kernel size greater than the input volume kernel size.

FIG. 4D illustrates the upsample layer 432 in greater detail. The upsample layer 432 can receive an input volume 404, for example, via the residual layer 436B. The upsample layer 432 can include a transpose convolution layer 434A, convolution layer 434B, and batch normalization layer 434C. The convolution layer 434B and the batch normalization layer 434C can be similar to the corresponding layers of FIG. 4C. The transpose convolution layer 434A can also refer to a deconvolution layer for up-sampling the dimensions. The transpose convolution layer 434A can decompress the dimensions, such as to provide a larger dimensions for extraction of relevant information. The transpose convolution layer 434A can include a kernel of 2×2×2 dimensions with a stride of 2, similar to the max pooling layer

422C. The transpose convolution can perform similar, but opposite steps to the max pooling layer 422C. For example, the max pooling layer 422C copies the pool of pixels associated to the kernel dimensions and stride value to obtain each pixel of the output volume. The transpose convolution layer 434A instead copies each pixel of the input volume to the dimensions of the kernel to provide the output volume with a pool of pixels associated with the kernel dimensions and the stride value.

In further example, and using 2D input and output volume for simplicity, the transpose convolution layer 434A can include a kernel of size 2×2 with a stride of 2. The transpose convolution layer 434A can receive a 2×2 input volume. The transpose convolution layer 434A can copy each pixel of the input volume to the kernel dimensions, such that if the pixel of 1×1 contains a value of one, the kernel fills the 2×2 dimensions with ones and position the kernel window to the output volume. The process can be repeated, opposite to the max pooling layer 422C, such that the output volume provides a 4×4 dimensions. In one embodiment, the transpose convolution layer 434A can provide a non-overlapping window to the output volume to double the dimensions size without modifying the pixel values. In another embodiment, a portion of the window can overlap with a different portion of a different window, as when the kernel window transition to a different location. The transpose convolution layer 434A can sum the overlapped portions to provide a different value to the output volume corresponding to the overlapped locations. The output volume of the transpose convolution layer 434A can transfer to the convolution layer 434B and the batch normalization layer 434C, respectively. The upsample layer 432 can produce an upsampled volume having dimensions of a size greater than, for example, the dimensions of the downsampled volume and a kernel size similar to the GPC layer 424.

Figure 4E:
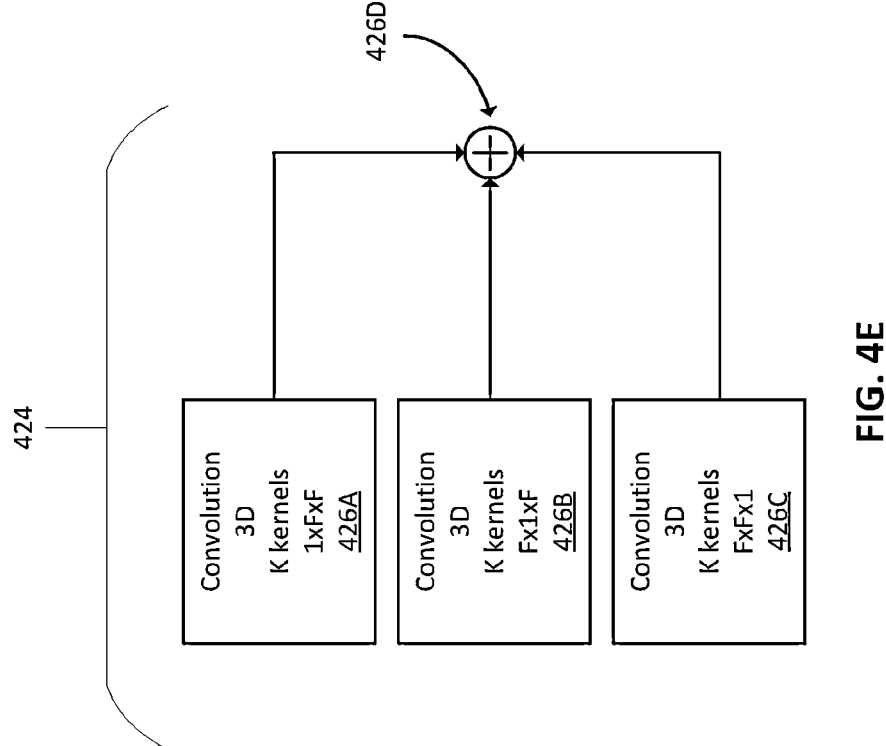

FIG. 4E illustrates the GPC layer 424 in greater detail. The GPC layer 424 can include the GPC layer 424A/424B. CNN architecture can implement the GPC layer 424 subsequent to the residual layer 416A/416B. The GPC layer 424A can reside in the skip-connection 460 for enabling the skip-connection 460 between two or more volumes having dimensions of different size. The GPC layer 424 can produce one or more global volumes for concatenation 464 to create a single image including the segmented tumor. In one embodiment, the GPC layer 424B can produce a global volume for passing to the upsample layer 432. The passed global volume can refer to the second global volume to concatenate 464 with the first global volume produced by the GPC layer 424A.

The GPC layer 424 can receive the input volume 404, for example, via the residual layer 416A/416B. The received input volume 404 for the GPC layer 424 can refer to at least the residual volume or the residual downsampled volume. The GPC layer 424 can configure the dimensions of the input volume 404, such as to conform the volume for concatenation 464. The GPC layer 424 can include a kernel size, which CNN architecture 300 can determine as describe in FIG. 3. The GPC layer 424 can include various convolution layers 426A-C. The GPC layer 424 can convolve planner filters (e.g. filters in which one of the three dimensions has size 1) in each of the three orthogonal directions. For example, given dimensions of length, width, and height (e.g. L×W×H), the convolution layer 426A can set the length to size 1, the convolution layer 426B can set the width to the size of 1, and the 426C can set the height to size of 1. The input volume passing through each convolution layer 426A-C can result in a plurality of planar feature maps. The planar feature maps refer to intermediate volumes for summation 426D. The summation 426D of the intermediate volumes can produce at least one global volume.

In one embodiment, the GPC layer 424 can include additional convolution layer (not seen in the figure). The additional convolution layer can account for increase of the input volume 404 dimensions, for example, from a 3D volume to a 4D volume. The GPC layer 424 can also remove one convolution layer, for example, the convolution layer 426C to account for reduction of the input volume 404 dimensions. The reduction of dimensions can refer to the input volume 404 having 2D volume instead of 3D volume.

In one embodiment, the residual layer 428 residing subsequent to the GPC layer 424A may be remove. In one other embodiment, the residual layer 428 can reside subsequent to the GPC layer 424A to localization capabilities of the input volume 404. The residual layers 428/436B introduced subsequent to the GPC layer 424 may not include the activation layer 418G as described in FIG. 4B above. The GPC layer 424, as for example, can produce the global volume to pass through the residual layer 428/436B for the upsample layer 432 and/or concatenating 464 two or more global volumes to produce the output volume. The output volume can pass through the residual layer 436A, the convolution layer 440, and the activation layer 444 as described in FIG. 3, for the display 448 to output one or more images of the delineated or segmented tumor of the brain.

Referring back to FIG. 3, and in more detail, CNN architecture 300 can be fed with two or more 3D patches of the brain to increase the accuracy of tumor segmentation. Multiple 3D patches can be provided to CNN architecture 300 by concatenating the volumes along the last tensor dimension. The concatenation can result in a tensor with shape W×H×D×C, where W represents width, H represents height, D represents depth, and C represents the number of channels, which can be, for example, 4 depending on the availability of imaging modalities.

The first operation included in the network can pad the input with reflection in order to, for example, have a shape that is valid for the number of downsampling operations that the network includes. That is, if the network has N downsampling operations, the tensor is halved N times, therefore the final shape will be $I/2^N$, where I is the initial shape. Further, the input can be a multiple of the downsampling factor $2^N$. This can be done by, for example, finding the next closest shape S that is a multiple of such downsampling factor, and padding the tensor with quantity P=S−I to get to that shape. For example: (1) Initial tensor shape (I): (64, 62, 73); (2) Number of downsampling operations (N): 3; (3) Downsampling factor (2 N): 8; (4) Desired shape(S): (64, 64, 80); (5) Amount of padding (P): (0, 2, 7).

After the dimensions are adapted to match the network architecture, a first convolution operation can transform the tensor to go from having C channels to having FM feature maps. The value of FM is the number of feature maps at that first level. For example and referring to CNN architecture 300 of FIG. 3, FM=8. The convolution layer 412 can include a kernel size 1×1×1 which can be effectively "shuffling" the channels per voxel. After the convolution layer 412, a batch normalization operation can be included.

The downsampling path or encoding path can consist of a series of operations performed at each resolution level plus a downsampling operation that halves the dimensions of the tensor and doubles its number of feature maps. That means, for a given initial shape (W, H, D, FM), number of initial feature maps FM and number of downsampling operations N, the shape of the tensor at the bottom level can be (W/2

N, H/2 N, D/2 N, FM*2 N). For example: (1) initial shape (I): (256, 256, 256, 32); (2) number of downsampling operations: 4; (3) Downsampling factor ($2^N$): 8; (4) number of initial feature maps (FM): 32; (5) Shape of the tensor at the bottom level: (16, 16, 16, 512).

At each level, the first set of performed operations can wrap around a layer, such as the residual layer 416. For example, The residual layer 416, which can apply to an input tensor X, can consist of the following sequence of operation: X→Convolution (filters=fm, filter size=(3, 3, 3))→Batch Normalization→Non-linear activation→Convolution (filters=fm, filter size=(3, 3, 3))→Batch Normalization→ Concatenation with X→Non-linear activation where fm can depend on the current level "n" in the following way: fm=FM*$2^n$. In one embodiment, the input tensor can refer to the input volume 404. Subsequently, the tensor can proceed through 2 different paths. In the first path, the tensor can be downsampled using a convolutional layer 422A that can adapt the number of feature maps for the next level (fm←fm*2) and then a max-pooling operation of the max pooling layer 422C can be used to halve the dimensions of the tensor, using windows of size (2, 2, 2) and stride (2, 2, 2). In the other, the tensor can pass through a GPC layer 424 with filter size F and number of filters/feature maps K. The transformed tensor can subsequently pass through a different residual layer 436, but this time the number of feature maps is set to K instead of fm. A reference to the resulting tensor can be saved, for later use in the decoding path. A transition block can consist of a residual layer 416, followed by a GPC layer 424 with kernel size F and K filters, and then a residual layer with K filters too.

A decoding path, similarly to the encoding path, can consist of a series of operations performed at each resolution level plus an upsampling operation that doubles the dimensions of the tensor and keeps the number of feature maps. For example, as the shape of the input tensor correspond to the tensor output by the transition block, the dimensions can transform from (W/$2^N$, H/$2^N$, D/$2^N$, K) to (W, H, D, K).

At each level, the transposed convolution layer 434A with a kernel size of (2, 2, 2) and strides (2, 2, 2) can be performed to double the spatial dimensions of the input tensor. The transposed convolution layer 434A can provide an opportunity to learn an upsampling scheme for better representation of the tumor for segmentation. The resulting tensor can be normalized using the batch normalization layer 434C. The tensor can be obtained in the encoding path as a result of, for example, passing through the GPC layer 424 and the extra residual layer 428 can be concatenated along the last dimension with the upsampled and normalized tensor. This tensor can be non-linearly transformed with an activation function via at least the activation layer 414C/418C/418G. Finally, the tensor can pass by the extra residual layer 428 with K filters.

By the end of the decoding path the tensor can be of shape (W, H, D, K). To provide a segmentation map of the 3 regions of interest of the tumor plus the background, a final convolutional layer 440 with filter size (1, 1, 1) and 4 filters can be included for the output tensor to have 4 channels, each representing the likelihood, for example, of each voxel to belong to one of the 4 classes. The resulting tensor of from the convolution layer 440 with shape (W, H, D, 4) can then be passed to the display 448.

Figure 4F:
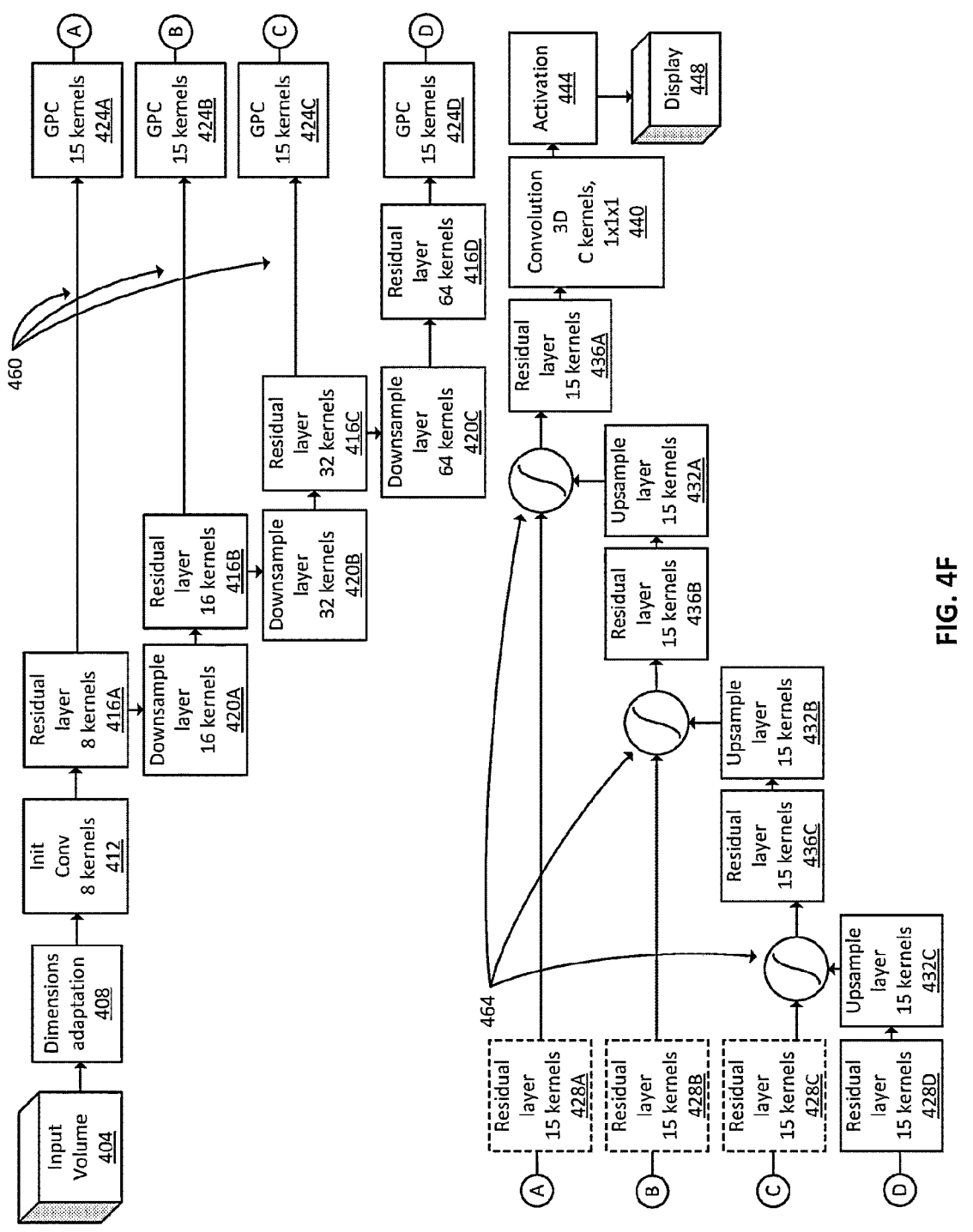

FIG. 4F illustrate an additional example overview of a convolutional neural network architecture diagram. Referring back to the illustration of FIG. 3, a single representation level was shown, demonstrating a single skip-connection 460. FIG. 4F illustrates inclusion of additional representation level. In this exemplary, CNN architecture 300 can include a plurality of additional downsample layer 420A-C, residual layers 416A-D/428A-D/436A-C, upsample layers 432A-C, and GPC layers 424A-D. The input volume 404 can be pass to the display 448 similarly as described in FIG. 3. In one embodiment, the step of passing the residual volume from the residual layer 416A to the downsample layer 420A can be repeated for the residual layer 416B/416C and the downsample layer 420B/420C. Similarly to repeating the residual layer 416B/416C and the downsample layer 420B/420C, the steps of passing the input volume 404 through the GPC layers 424A-D, the upsample layer 432A-C, and the concatenation 464 can be repeated corresponding to the preceding executions of the various CNN architecture 300 layers. Specifically, FIG. 4F illustrates a three representation level of CNN architecture 300 with, for example, 16, 32, and 64 kernels at each convolutional layer prior to the GPC layer 424. The GPC layer 424 can maintain the same kernel size and dimensions. In further exemplary embodiment, CNN architecture 300 can include additional representation level to increase the kernel size from 64 to 128, 128 to 256, and so forth. It should, therefore, be understood that the convolutional neural network architecture described herein can have an arbitrary number of levels and is not limited to two levels or four levels.

In one embodiment, the CNN architecture 300 can merge 3D patches of segmented tumor images. The 3D patches can be from the same brain with different modalities. The merging can occur, for example, responsive to passing the 3D patches to the activation layer 444 for display 448. In some cases, the input volume 404 can be the merged 3D patches of the various modalities of the brain. In some other cases, two input volumes 404 can be provided to CNN architecture 300 for simultaneous filtering. The two input volumes 404 can, for example, merge during passing the input volume 404 through the various layers, such as during the dimensions adaptation layer 408, the GPC layer 424, or the activation layer 444. The different 3D patches can combine to, for example, further delineate and identify the tumor from the healthy portions of the brain.

FIG. 5 illustrates a block diagram of an example system 500 to execute the convolutional neural network architecture. The system 500 can include or be used to implement one or more aspect of the methods described in at least FIG. 3 and FIG. 4-F. For example, the system 500 can implement one or more component or functionality of the CNN architecture 300. The system 500 can include at least a computer 510, imaging device 520, display device 530, and database 540. The computer 510 can include at least one bus or other communication component for communicating information and at least one processor or processing circuit coupled to the bus for processing information. The communication component can include at least a wireless transmitter/receiver, cable, satellite, or cellular communication. The computer 510 can also include one or more processors or processing circuits coupled to the bus for processing information. The computer 510 can further include at least one main memory, such as a random access memory (RAM) or other dynamic storage device, coupled to the bus for storing information, and instructions to be executed by the processor of the computer 510. The main memory can further be used for storing one or more information used for tumor segmentation. The computer 510 may further include at least one read only memory (ROM) or other static storage device coupled to the bus for storing static information and instructions for the processor.

The imaging device 520 can include MR imaging scanner, X-rays, computed tomography (CT) scan, ultrasounds, or nuclear medicine imaging. The imaging device 520 can collect or extract raw information on one or more portions of the body, including the brain. The imaging device 520 can transmit the raw information to the computer 510 via at least one of the communication component. In one embodiment, the imaging device 520 can be coupled with one or more processors for filtering the raw information for transmission to the computer 510. The imaging device 520 can convert the information to at least one format, such as NIFTI or DICIM.

The computer 510 may be coupled via the bus to a display device 530, such as a liquid crystal display, or active matrix display, for displaying information associated with the segmented tumor. The display device 530 can be remote from the computer, for communication via wireless connection, for example. The display device 530 can display raw information from the imaging device 520. The display device 530 can further display filtered information, such as to display the segmented tumor by the CNN architecture 300.

The database 540 in communication with the computer 510 can reside external to and remote from the computer. The database 540 can be a hard disk, a CD-ROM, a flash memory card, a PROM, a RAM, a ROM, or a magnetic tape. In one embodiment, the database 540 can refer to a storage space in a cloud. The database 540 can include a plurality of elements, such as a whole-brain volume data 542, 3D patches data 544, CNN architecture data 546, and tumor data 548. The descriptive definition or functionality of the elements can be referred to in greater details in previous description, as seen in FIG. 3, and FIG. 4-F.

The system 500 described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

FIG. 6 illustrates an exemplary diagram of the steps taken by a data processing pipeline 600 to process image data. The example described herein does not, in any manner, limit the scope of the subject matter of the invention. Each of the dataset in from the database can be co-registered to the same anatomical template, skull-stripped and resampled to 1 mm³ isotropic resolution. The dataset can include labeling scheme, for example, edema can be assigned to label 1, enhancing tumor to label 2, and necrosis and non-enhancing tumor to label 3.

The original acquisitions of the dataset can all co-aligned in subject space—e.g., all the image modalities were in the same coordinate space, the space in which the subject was scanned, meaning that they are all aligned with respect to each other—and were provided in DICOM format. The following preprocessing pipeline can execute for each dataset. First, DICOM format can convert to NIFTI format, which is the most common format for neuroimaging processing tools. Second, images can reorient to canonical RAS+ orientation, that is, all voxel coordinate spaces were reoriented so that the x, y, z axes were oriented along the Left-Right, Posterior-Anterior and Inferior-Superior directions, respectively. Third, the system 500 can, for example, automatically extract the brain from MR images and, therefore, eliminate irrelevant information for most of the neuroimaging problems, particularly brain tumor segmentation. Fourth, the images can be resampled to 1 mm³ isotropic resolution. Clinical data can include resolution (1 mm or less) in one plane and the others have lower resolution, such as 3 mm. The database, however, can provide images with decent isotropic resolution to ease the resampling process. Fifth, ground-truth (GT) annotation can be delivered in separate files. For comparability between the database and a different database, such as a BraTS database, the labels can include similar the same scheme as described previously:

label 1 for edema, label 2 for enhancing tumor, and label 3 for necrosis and non-enhancing tumor.

Quality Assurance procedures can be conducted prior to and subsequent to applying the preprocessing pipeline outlined before. This exemplary procedure consisted in extracting axial plane images of all the modalities in each dataset and visually inspecting for defects or misalignments.

The data processing pipeline 600 can include at least one set of operations that have the purpose of loading the data from source, transforming it to an appropriate format for the learning algorithm or function, in this case a CNN, and then feeding it to such algorithm or function to perform computations. It is considered a standard Extract, Transform, Load (ETL) process, which enforces data quality, consistency and conformity to expected data format.

The pipeline 600 can start by listing the available sources of data (step 610), in this case the subjects available for the current phase of the execution process (train, evaluation and test). These data sources are then introduced in a queue that can be shuffled if specified. A mapping function can represent the Transform operations that is applied to each of the sources. This mapping function can be responsible for reading the data (step 610 and step 620), optionally applying preprocessing (step 630) and data augmentation operations (step 640), and outputting the data in the expected format for image processing (e.g. machine learning). The transformed data can be shuffled again, and then a prefetching operation is performed to optimize the parallelism of the ETL process. Finally, the data can be grouped in batches and loaded into the memory of the system 500 used to process it, typically an accelerated computing device such as a Graphics Processing Unit (GPU) or a Tensor Processing Unit (TPU). The whole ETL process is designed from the ground-up to be asynchronous, so that each of these sets of operations (extract, transform and load) can be executed in parallel and therefore avoid the computational bottlenecks that could occur in a sequential execution scenario.

The system 500 can read both the MR images and the labels from the database in NIFTI format, which can result in a 3D tensor of data. The database can refer to, and use interchangeably with other descriptive terms, such as a disk, storage, memory, and other elements for storing data. The images can concatenated along the last axis, creating a 4D tensor of dimensions W×H×D×C, where C can be a value of the channel, as in FIG. 3. This data format is analogous to the data format used in natural images, where the data is "seen" as 2D but in reality is a 3D tensor of dimensions W×H×C. The 3D tensor channel (C) can be, for example, three channel, which can stand for the color channels in the RGB image. The labels, on the other hand, can be one-hot encoded: from a 3D tensor in which each voxel contains a single numeric value representing the label of that voxel (one of 0, 1, 2 or 3), a 4D tensor of dimensions W×H×D×C is created in which a 1 is put in the axis of the last dimensions that corresponds to the label value of that voxel. For example, if a voxel located at position x, y, z has label 2, after one-hot encoding it will be represented as $1_{x,y,z}=[0, 0, 1, 0]$. After image concatenation, a brain mask is extracted by simple thresholding. Thresholding can refer to an extraction operation, where any value bigger than 0 will be considered brain. With the extracted mask and the fact that the data is aligned, the system can perform a standardization operation over each modality individually only considering the voxels that belong to the brain.

Finally, the system 500 can use the 3D patch extraction mechanism to generate patches of brain data (step 650) The reason of such data augmentation mechanism (step 640) can be two-fold: first, by using patches of reduced size instead of whole-brain volumes the system reduces the computational and memory requirements. With the reduced computational and memory requirements, models with greater capacity can be trained and batch sizes bigger than one can be used in the GPUs; second, patch extraction provides a mechanism to balance the class representation in this problem, which is highly unbalanced by nature Regardless of how big a tumor is, it will always represent a small percentage of volume with respect to the whole brain. This can be especially true for specific intra-tumoral structures, such as the enhancing tumor.

The patch extraction mechanism can receive or retrieve, as input, the volume of the whole brain and, optionally, the expert annotations' volume (representing the whole brain as well), and outputs a set of patches whose center is chosen randomly and, in case of providing the expert annotations, can be based on the desired distribution of class representation. The patch size and the class representation distribution can be parametrized, meaning that the system 500 can choose to extract smaller or bigger patches, and to over-represent or under-represent specific classes. The system 500 can also accept a mask that specifies the set of valid locations from where the centers of the patches can be chosen at random. In one embodiment, even though a patch can be centered in a voxel containing one of the intra-tumoral structures, the rest of the voxels of such patch do not necessarily belong to tumoral tissues. In another embodiment, even though the center voxel of a patch can belong to background the other voxels might belong to tumoral structures (e.g. when the central voxel is located near the boundary of the tumor).

FIG. 7 illustrates an axial representation of an example patches 700 of imaged brain tissue. The patches 700 of brain tissue can be of size 80×80×80. The patches 700 can represent the resulting labels of the patch passing through the layers of CNN architecture 300. The patches 700 can include a T1-Gd patch 710, T2-FLAIR patch 720, T1-weighted patch 730, T2-weighted patch 740, and expert annotations patch 740. The expert annotations patch 740 can refer to a desired result of tumor segmentation. Each of the patches 700 includes the same tumor displayed with different modalities. The color scheme or label in the expert annotations can be red for edema, green for enhancing tumor, and blue for necrosis and non-enhancing tumor. CNN architecture 300 can generate the tumor segmented image, similar to the expert annotations patch 740, using at least one patch 700 with the modality.

In further detail and as an example, results from comparison between different architecture can be described herein. The results describe herein are not meant to limit the scope of the invention. All the Convolutional Architectures implemented and trained herein can be 3D and fully-convolutional by design, meaning that they can be trained using 3D patches of data (with all the advantages that this entails, as explained in subsection IV-A), and they can be used for inference with whole brain volumes.

In further detail of the inventive architecture, CNN architecture 300 can address the localization aspect of semantic segmentation networks with the introduction of skip-connections 460 and residual layers 416, as these components let low level representations pass through the network and inform the latest layers about fine-grained spatial details. CNN architecture 300 can further rely on layers that are globally connected, which in the most extreme case (all the nodes are connected with each other) corresponds to a fully-connected layer. Such type of operation may not feasible in a fully-convolutional architecture, however the system 500 using CNN architecture 300 can approximate global connectivity by increasing kernel size in convolutions: in the limit, the kernel is as big as the input feature map, which can be interpreted again as a fully-connected layer. The system 500 can further approximate the global connectivity by constraining the kernel parameters' subspace. Specifically, the system 500 can constrain the convolutional kernels to have one dimension less than they would normally have, which in practice is implemented by having kernels with size 1 in one of the dimensions. These reduction of parameters in one of the three dimensions can allow the growth of kernel sizes in the other dimensions, thus providing improved global connectivity. An introduction of the global connectivity can be done by at least the GPC layer 424 of CNN architecture 300.

In this exemplary embodiment for implementing and testing various architectures, which does not limit the scope of the invention, the databases are split into a training and validation set. The availability of test data is ensured from different sources—the test set used for ranking in Multimodal Brain Tumor Segmentation (BraTS) challenge, and proprietary clinical data, which eliminates the necessity of creating a third split for test. The BraTS challenge, as an example, can include a BraTS database with various brain images for tumor segmentation. At least one of the brain images can include a ground truth (GT) label image as a comparison to various segmentation results from the architectures. The test or challenge is based on at least one comparison between different architectures to segment the tumor from brain images in aim of matching the GT label image. The GT label can be revised by expert board-certified neuroradiologists for various main tumor structure labels including edema, enhancing tumor, or necrosis and non-enhancing tumor. A split ratio of 70%-30% for train and validation, respectively, was used. This results in 199 datasets for training and 86 datasets for evaluation within the BraTS database, and 457 datasets for training and 197 datasets for evaluation within the proprietary database. The details of the data splits can be summarized in Table I.

TABLE I

Summary of data splits in BraTS and proprietary databases.

| Database | Total datasets | Train datasets | Validation datasets | Test datasets |
|---|---|---|---|---|
| BraTS | 285 | 199 | 86 | BraTS challenge test set |
| Proprietary Database | 652 | 457 | 197 | Clinical validation data |

The targets of model evaluation can be tumoral structures that merge a subset of the intra-tumoral classes. The system can evaluate several metrics, outlined further in this section, on the following structures:

Whole Tumor: comprises all the tumoral structures, i.e. edema, enhancing tumor and tumor core.

Enhancing Tumor: comprises only the enhancing tumor class.

Tumor Core: comprises both the enhancing tumor and the necrosis and non-enhancing tumor structures, thus excluding edema.

The metrics used to evaluate the models are all based on the four basic metrics of a confusion matrix:

True Positives (TP): positive examples that have been predicted as such.

True Negatives (TN): negative examples that have been predicted as such

False Positives (FP): negative examples that have been predicted as positive.

False Negative (FN): positive examples that have been predicted as negative.

The primary metric for evaluation can be the Sørensen-Dice coefficient, usually abbreviated as DICE or Dice similarity coefficient (DSC), which is the statistic used for comparing the similarity of two sets, and is not very different from the Intersection over Union, sometimes referred to as Jaccard index. The formula that defines the DICE metric is:

$$DICE(A, B) = \frac{2|A \cap B|}{|A| + |B|} \tag{1}$$

The two sets that are compared in this formula for the task at hand are the set of true examples and the set of positive examples. Therefore the formula can be re-written in the following form:

$$DICE = \frac{2TP}{2TP + FP + FN} \tag{2}$$

It is a balanced metric because it penalizes both False Positives and False Negatives, and it is widely used in the segmentation research community, such as in the medical domain.

The system can also consider other metrics such as precision, sensitivity (also known as recall or True Positive Rate) and specificity (also known as True Negative Rate). The formulas of each of these metrics are the following:

$$Precision = \frac{TP}{TP + FP} \tag{3}$$

$$Sensitivity = \frac{TP}{TP + FN} \tag{4}$$

$$Specificity = \frac{TN}{TN + FP} \tag{5}$$

Therefore, precision favors models that are precise in their predictions, even if they miss a lot of positive examples (tendency towards under-segmentation); sensitivity favors models that do not miss any positive example, even if they falsely predict as positive examples that are negative (tendency towards over-segmentation); finally, specificity is the complementary metric of sensitivity, and it favors models that do not miss any negative example (tendency towards under-segmentation, as the precision metric).

Weighted categorical cross-entropy can be selected as the loss function to be minimized during training. A custom implementation of such loss can be required in order to extend it to 4D tensors. The weights per class can be specified in order to explicitly penalize specific classes. The complete loss function to be minimized can include L1 and L2 penalization of the weights (for regularization purposes) with penalization ratios of 1E−6 and 1E−4, respectively.

The models described in this exemplary can be trained using an ADAM optimizer. The initial learning can be set to 1E−3 in all experiments, and a learning rate decay policy can be integrated in order to stabilize training as the training procedure progressed. Concretely, the system can use an exponential decay of the learning rate every 1000 training steps with a decay rate of 0.9. The number of training steps can depend on the complexity of the model and the database that was being used, ranging from 30000 to 75000. The training procedure alternated 1000 training steps with 1 complete evaluation of the model. Batch size can also vary, oscillating between 4 and 12, and depended on the number of parameters of the network and its memory requirements; in all cases the system can maximize the batch size within the memory limits of the available hardware for the sake of efficiency.

The system can use the preprocessing and data augmentation pipeline specified in subsection IV-A for all the experiments. During training the data ingestion pipeline can be configured to extract patches of size 80×80×80 with 50% probability of being centered on a background voxel and 50% on a tumor voxel (50% background, 20% edema, 15% enhancing tumor and 15% necrosis and non-enhancing tumor). Preprocessed whole brain volumes can be used during evaluation in order to provide a realistic value of performance in a real-world scenario—in which whole brain volume inference is required.

The system can perform data ablation experiments by restricting the available input modalities at train time, but always maintaining the minimum required modalities to properly identify all structures, namely T1-Gd and FLAIR. The motivation for such experiments can be two-fold: first, computation; however if the model gives a prediction of that structure, the dataset is excluded from statistics computation. When training with the BraTS database, all the train and validation datasets are considered for whole tumor and tumor core statistics, and only the 10% of train and 5% of validation datasets are excluded from enhancing tumor statistics.

CNN architecture 300 can train with all the available MRI modalities, as it presents the best DICE scores in the validation set for whole tumor and enhancing tumor structures. CNN architecture 300 can be compared with ResUNet architecture using a ResUNet model. ResUNet architecture can be introduced in He, Kaiming, et al. "Deep Residual Learning for Image Recognition." ArXiv.org, Microsoft Research, 10 Dec. 2015, arxiv.org/abs/1512.03385v1" reference. ResUNet model that is trained only with T1-Gd, FLAIR and T1 modalities, thus excluding T2-related characteristics, has worse performance at whole tumor segmentation than CNN architecture 300 or ResUNet model trained with all modalities. Such behavior can be attributed to the exclusion of T2's redundant information, as FLAIR provides almost the same information regarding edema, and because of that the network is encouraged to put special attention to other modalities and consequently other structures.

TABLE II

DICE of target structures on the train and validation sets of the BraTS database.

| | Whole Tumor | | Tumor Core | | Enhancing Tumor | |
|---|---|---|---|---|---|---|
| | Train | Validation | Train | Validation | Train | Validation |
| UNet—all modalities | 0.855 ± 0.107 | 0.847 ± 0.095 | 0.736 ± 0.212 | 0.694 ± 0.235 | 0.702 ± 0.244 | 0.698 ± 0.229 |
| ResUNet—all modalities | 0.903 ± 0.064 | 0.892 ± 0.064 | 0.841 ± 0.148 | 0.785 ± 0.200 | 0.744 ± 0.218 | 0.739 ± 0.207 |
| ResUNet—T1-Gd, FLAIR, T1 | 0.907 ± 0.054 | 0.882 ± 0.080 | 0.860 ± 0.127 | 0.799 ± 0.171 | 0.756 ± 0.205 | 0.752 ± 0.193 |
| ResUNet—T1-Gd, FLAIR | 0.900 ± 0.062 | 0.884 ± 0.070 | 0.824 ± 0.171 | 0.790 ± 0.184 | 0.739 ± 0.215 | 0.723 ± 0.218 |
| CNN—all | 0.918 ± 0.047 | 0.897 ± 0.059 | 0.891 ± 0.084 | 0.797 ± 0.195 | 0.784 ± 0.197 | 0.752 ± 0.207 |
| CNN—T1-Gd, FLAIR, T1 | 0.912 ± 0.058 | 0.881 ± 0.071 | 0.871 ± 0.097 | 0.770 ± 0.211 | 0.777 ± 0.209 | 0.743 ± 0.216 |
| CNN—T1-Gd, FLAIR | 0.909 ± 0.082 | 0.878 ± 0.080 | 0.885 ± 0.103 | 0.770 ± 0.216 | 0.786 ± 0.198 | 0.734 ± 0.231 | the system assesses the relative contribution of each modality to the overall segmentation, and inspect if some modalities are redundant or indeed provide useful information; second, it is convenient and even necessary to have models that can work with a restricted number of modalities from a practical point of view, as in some clinical cases not all MR sequences are included in the protocol, even if such models with restricted input information do not perform as well as in the non-restricted case.

Referring to testing with BraTS database. In Table I, the DICE coefficients for all target structures outlined in subsection V-B of all the architectures, trained with different data configurations. The system can compute the mean and standard deviation over all train and validation datasets, with some exceptions: if a specific dataset does not have a specific structure (usually enhancing tumor, in Low Grade Glioma cases), and the model predicts so, the assigned DICE coefficient is 1 and the dataset is considered for statistics FIG. 8 illustrates an axial representation 800 of an example segmented brain tumor by ResUNet and the convolutional neural network architecture described herein. In addition to the previously mentioned examples of FIG. 7, an evaluation can be performed on CNN architecture 300 and ResUNet models and an ensemble of these two models on the BraTS 2018 validation data. Model ensembling can yield more robust segmentation maps by reducing the influence of the hyper-parameters and configurations of individual models. Specifically, the evaluation performs a computation of the average confidence score per class for each voxel across the models in the ensemble for the CNN architecture 300. The evaluation can obtain the final segmentation by assigning to each voxel the class with the highest average confidence score. As a consequence of model ensembling. CNN architecture 300 can improve DICE scores and Hausdorff 95% quantile distances in various structures (shown in table 1). Therefore, this model ensemble to the BraTS 2018 challenge can be submitted. A report of the resulting scores can be seen in table 2.

TABLE 1

| | Dice | | | Hausdorff 95 | | |
|---|---|---|---|---|---|---|
| | ET | WT | TC | ET | WT | TC |
| ResUNet | 0.729 ± 0.279 | 0.882 ± 0.071 | 0.741 ± 0.256 | 5.578 ± 11249 | 9.896 ± 16.803 | 9.532 ± 12.407 |
| CNN | 0.735 ± 0.281 | 0.883 ± 0.112 | 0.753 ± 0.269 | 7.004 ± 13.944 | 7.594 ± 12.453 | 9.505 ± 11.557 |
| Ensemble | 0.758 ± 0.264 | 0.895 ± 0.07 | 0.774 ± 0.253 | 4.502 ± 8.227 | 10.656 ± 19.286 | 7.103 ± 7.084 |

TABLE 2

| | Dice | | | Hausdorff 95 | | |
|---|---|---|---|---|---|---|
| | ET | WT | TC | ET | WT | TC |
| Ensemble | 0.694 ± 0.289 | 0.856 ± 0.147 | 0.754 ± 0.283 | 6.872 ± 13.21 | 9.676 ± 15.947 | 8.123 ± 12.713 |

The images of the axial representation 800 can illustrate the results of the tumor segmentation as represented in table 1 and table 2. The axial representation 800 can include a first brain 802 and a second brain 826 demonstrated with T2-FLAIR 804/828 and T1-Gd 812/836 modalities, and GT label 820/844. The GT label 820/844 can be the expert annotated label for comparing the modalities. The exemplary axial representation 800 can illustrate a corresponding segmented tumor based on a combination of T2-FLAIR and T1-Gd modalities. The corresponding segmented tumor can include the segmented ResUNet 808/832, CNN with 3 representation levels 816/840, and CNN with 4 representation levels 824/848.

It can be appreciated that, regardless of the models being used, whole tumor segmentation has less variability in terms of DICE score than tumor core or enhancing tumor segmentation. The reason is that edema, which is part of the whole tumor, is easily distinguishable and can be delineated precisely on FLAIR images, but all the structures in the tumor core (especially enhancing tumor) are fuzzier and have less defined borders. In addition, lower-grade tumors do not have some or all of the core tumor structures, which limits the training capabilities of a network tasked to segment them. Another pitfall is the inter-observer variability of the annotated labels, which are obtained via a consensus from one to four raters (as explained in subsection III-C). There is no doubt that these models fail to segment the tumor and its structures in some cases, but in others it is doubtful that the segmentation produced is not correct, even though it differs from the expert annotations. Qualitative examples that illustrate this behavior can be found in subsection VI-D.

The invention claimed is:

1. A method:
   (a) receiving data representing an input volume having dimensions of a first size and a first kernel size;
   (b) producing a residual volume from the received input volume having dimensions of the first size;
   (c) convolving, to a first intermediate residual volume, a first dimension of the residual volume to size of 1;
   (d) convolving, to a second intermediate residual volume, a second dimension of the residual volume to size of 1;
   (e) convolving, to a third intermediate residual volume, a third dimension of the residual volume to size of 1;
   (f) summing the first intermediate residual volume, the second intermediate residual volume, and the third intermediate residual volume to create a first global volume having dimensions of a second size and a second kernel size;
   (g) producing a downsampled volume having dimensions of a third size and a third kernel size from the received input volume, wherein dimensions of the third size comprise dimensions of half the first size and the third kernel size is double the first kernel size;
   (h) producing a residual downsampled volume from the downsampled volume having dimensions of the third size and the third kernel size;
   (i) convolving, to a first intermediate downsampled volume, a first dimension of the downsampled volume to size of 1;
   (j) convolving, to a second intermediate downsampled volume, a second dimension of the downsampled volume to size of 1;
   (k) convolving, to a third intermediate downsampled volume, a third dimension of the downsampled volume to size of 1;
   (l) summing the first intermediate downsampled volume, the second intermediate downsampled volume, and the third intermediate downsampled volume to create a second global volume having dimensions of a fourth size and the second kernel size;
   (m) upsampling the created second global volume having dimensions of the fourth size to increase the dimension size to dimensions of the second size; and
   (n) integrating the first global volume and the second global volume to create an output volume having dimensions of the second size and the second kernel size.

2. The method of claim 1 wherein the step of producing the residual volume comprises:
   (a) convolving the received input volume data having dimensions of the first size;
   (b) normalizing the convolved volume having dimensions of the first size; and
   (c) producing the residual volume by transforming the normalized volume in a non-linear manner.

3. The method of claim 1, wherein producing a residual volume comprises producing a residual volume from the input volume having preselected length, width, and height dimensions.

4. The method of claim 1, wherein step (b) comprises:
   (a) convolving the received input volume;
   (b) normalizing the convolved input volume;

(c) transforming the normalized input volume in a non-linear manner;

(d) convolving the transformed input volume;

(e) normalizing the transformed convolved input volume;

(f) summing the transformed normalized input volume and the convolved input volume to produce an intermediate residual volume;

(g) transforming the intermediate residual volume in a non-linear manner; and (h) regularizing the transformed intermediate residual volume to produce a residual volume having dimensions of the first size.

5. The method of claim 1, wherein step (f) comprises:

(a) summing the first intermediate residual volume, the second intermediate residual volume, and the third intermediate residual volume to create a first intermediate global volume;

(b) convolving the first intermediate global volume;

(c) normalizing the convolved first intermediate global volume;

(d) transforming the normalized first intermediate global volume in a non-linear manner;

(e) convolving the transformed first intermediate global volume;

(f) normalizing the transformed convolved first intermediate global volume; and (g) summing the transformed normalized first intermediate global volume and the convolved first intermediate global volume to produce the first global volume showing dimensions of a second size and a second kernel size.

6. The method of claim 1, wherein step (l) comprises:

(a) summing the first intermediate downsampled volume, the second intermediate downsampled volume, and the third intermediate downsampled volume to create a second intermediate global volume;

(b) convolving the second intermediate global volume;

(c) normalizing the convolved second intermediate global volume;

(d) transforming the normalized second intermediate global volume in a non-linear manner;

(e) convolving the transformed second intermediate global volume;

(f) normalizing the transformed convolved second intermediate global volume; and (g) summing the transformed normalized second intermediate global volume and the convolved second intermediate global volume to produce a second global volume showing dimensions of a fourth size and the second kernel size.

7. The method of claim 1, wherein step (g) comprises:

(a) convolving the received input volume;

(b) normalizing the convolved input volume;

(c) downsampling the normalized convolved input volume to a pooled volume having dimensions of the third size and the third kernel size, wherein the dimensions of the third size comprise half the first size and the third kernel size is double the first kernel size; and (d) transforming the pooled volume in a non-linear manner to produce the downsampled volume having dimensions of the third size and the third kernel size.

8. The method of claim 1, wherein step (n) comprises:

(a) producing a second downsampled volume having dimensions of a fifth size and a fourth kernel size from the residual downsampled volume, wherein dimensions of the fifth size comprise dimensions of half the third size and the fourth kernel size is double the third kernel size;

(b) producing a second residual downsampled volume from the downsampled volume having dimensions of the fifth size and the fourth kernel size;

(c) convolving, to a fourth intermediate downsampled volume, a first dimension of the second downsampled volume to size of 1;

(d) convolving, to a fifth intermediate downsampled volume, a second dimension of the second downsampled volume to size of 1;

(e) convolving, to a sixth intermediate downsampled volume, a third dimension of the second downsampled volume to size of 1;

(f) summing the fourth intermediate downsampled volume, the fifth intermediate downsampled volume, and the sixth intermediate downsampled volume to create a third global volume having dimensions of a sixth size and the second kernel size;

(g) upsampling the created third global volume having dimensions of the sixth size to increase the dimension size to dimensions of the second size; and (h) integrating the first global volume, the second global volume, and the third global volume to create an output volume having dimensions of the second size and the second kernel size.

9. The method of claim 1, wherein producing the downsampled volume comprises producing the downsampled volume from the received input volume having predetermined dimensions of the second size and/or the second kernel size.

10. The method of claim 1, further comprising:

(a) producing a residual output volume from the output volume having dimensions of the second size and the second kernel size;

(b) convolving the produced residual output volume; and (c) transforming the convolved residual output volume to produce a test volume having dimensions of the second size and the second kernel size.

11. The method of claim 1, further comprising displaying a visual representation of the output volume.

12. The method of claim 1, wherein integrating the first global volume and the second global volume comprises integrating the first global volume and the second global volume to create an output volume having dimensions of the second size and the second kernel size and a plurality of categorized segments to identify at least one outlier.

13. The method of claim 1, wherein upsampling the created second global volume doubles the dimension size of the second global volume while retaining the second kernel size.

14. A system to delineate and identify a tumor, the system comprising:

one or more processors and memory to:

(a) receive data representing an input volume having dimensions of a first size and a first kernel size;

(b) produce a residual volume from the received input volume having dimensions of the first size;

(c) convolve, to a first intermediate residual volume, a first dimension of the residual volume to size of 1;

(d) convolve, to a second intermediate residual volume, a second dimension of the residual volume to size of 1;

(e) convolve, to a third intermediate residual volume, a third dimension of the residual volume to size of 1;

(f) sum the first intermediate residual volume, the second intermediate residual volume, and the third intermediate residual volume to create a first global volume having dimensions of a second size and a second kernel size;

(g) produce a downsampled volume having dimensions of a third size and a third kernel size from the received input volume, wherein dimensions of the third size comprise dimensions of half the first size and the third kernel size is double the first kernel size;

(h) produce a residual downsampled volume from the downsampled volume having dimensions of the third size and the third kernel size;

(i) convolve, to a first intermediate downsampled volume, a first dimension of the downsampled volume to size of 1;

(j) convolve, to a second intermediate downsampled volume, a second dimension of the downsampled volume to size of 1;

(k) convolve, to a third intermediate downsampled volume, a third dimension of the downsampled volume to size of 1;

(l) sum the first intermediate downsampled volume, the second intermediate downsampled volume, and the third intermediate downsampled volume to create a second global volume having dimensions of a fourth size and the second kernel size;

(m) upsample the created second global volume having dimensions of the fourth size to increase the dimension size to dimensions of the second size; and (n) integrate the first global volume and the second global volume to create an output volume having dimensions of the second size and the second kernel size.

15. The system of claim 14, wherein the step of producing a residual volume comprising:

(a) convolve the received input volume data having dimensions of the first size;

(b) normalize the convolved volume having dimensions of the first size; and (c) produce a residual volume by transforming the normalized volume in a non-linear manner.

16. The system of claim 14, wherein step (b) comprises:

(a) convolve the received input volume;

(b) normalize the convolved input volume;

(c) transform the normalized input volume in a non-linear manner;

(d) convolve the transformed input volume;

(e) normalize the transformed convolved input volume;

(f) sum the transformed normalized input volume and the convolved input volume to produce an intermediate residual volume;

(g) transform the intermediate residual volume in a non-linear manner; and (h) regularize the transformed intermediate residual volume to produce the residual volume having dimensions of the first size.

17. The system of claim 14, wherein step (f) comprises:

(a) sum the first intermediate residual volume, the second intermediate residual volume, and the third intermediate residual volume to create a first intermediate global volume;

(b) convolve the first intermediate global volume;

(c) normalize the convolved first intermediate global volume;

(d) transform the normalized first intermediate global volume in a non-linear manner;

(e) convolve the transformed first intermediate global volume;

(f) normalize the transformed convolved first intermediate global volume; and (g) sum the transformed normalized first intermediate global volume and the convolved first intermediate global volume to produce a first global volume showing dimensions of a second size and a second kernel size.

18. The system of claim 14, wherein step (l) comprises:

(a) sum the first intermediate downsampled volume, the second intermediate downsampled volume, and the third intermediate downsampled volume to create a second intermediate global volume;

(b) convolve the second intermediate global volume;

(c) normalize the convolved second intermediate global volume;

(d) transform the normalized second intermediate global volume in a non-linear manner;

(e) convolve the transformed second intermediate global volume;

(f) normalize the transformed convolved second intermediate global volume; and (g) sum the transformed normalized second intermediate global volume and the convolved second intermediate global volume to produce a second global volume showing dimensions of a fourth size and the second kernel size.

19. The system of claim 14, wherein step (g) comprises:

(a) convolve the received input volume;

(b) normalize the convolved input volume;

(c) downsample the normalized convolved input volume to a pooled volume having dimensions of a third size and a third kernel size, wherein the dimensions of the third size comprise half the first size and the third kernel size is double the first kernel size; and (d) transform the pooled volume in a non-linear manner to produce a downsampled volume having dimensions of the third size and the third kernel size.

20. The system of claim 14, wherein steps (n) comprises:

(a) produce a second downsampled volume having dimensions of a fifth size and a fourth kernel size from the residual downsampled volume, wherein dimensions of the fifth size comprises dimensions of half the third size and the fourth kernel size is double the third kernel size;

(b) produce a second residual downsampled volume from the downsampled volume having dimensions of the fifth size and the fourth kernel size;

(c) convolve, to a fourth intermediate downsampled volume, a first dimension of the second downsampled volume to size of 1;

(d) convolve, to a fifth intermediate downsampled volume, a second dimension of the second downsampled volume to size of 1;

(e) convolve, to a sixth intermediate downsampled volume, a third dimension of the second downsampled volume to size of 1;

(f) sum the fourth intermediate downsampled volume, the fifth intermediate downsampled volume, and the sixth intermediate downsampled volume to create a third global volume having dimensions of a sixth size and the second kernel size;

(g) upsample the created third global volume having dimensions of the sixth size to increase the dimension size to dimensions of the second size; and (h) integrate the first global volume, the second global volume, and the third global volume to create an output volume having dimensions of the second size and the second kernel size.

* * * * *